(12) United States Patent
Sung et al.

(10) Patent No.: US 11,813,598 B2
(45) Date of Patent: Nov. 14, 2023

(54) LOW TEMPERATURE CO OXIDATION CATALYST

(71) Applicant: BASF Corporation, Florham Park, NJ (US)

(72) Inventors: Shiang Sung, New York, NY (US); Markus Koegel, Roemerberg (DE)

(73) Assignee: BASF Corporation, Florham Park, NJ (US)

( * ) Notice: Subject to any disclaimer, the term of this patent is extended or adjusted under 35 U.S.C. 154(b) by 0 days.

(21) Appl. No.: 17/593,378

(22) PCT Filed: Mar. 19, 2020

(86) PCT No.: PCT/IB2020/052543
§ 371 (c)(1),
(2) Date: Sep. 17, 2021

(87) PCT Pub. No.: WO2020/188518
PCT Pub. Date: Sep. 24, 2020

(65) Prior Publication Data
US 2022/0161248 A1 May 26, 2022

Related U.S. Application Data
(60) Provisional application No. 62/820,916, filed on Mar. 20, 2019.

(51) Int. Cl.
*B01J 35/04* (2006.01)
*B01J 23/62* (2006.01)
(Continued)

(52) U.S. Cl.
CPC ............ *B01J 35/04* (2013.01); *B01D 53/944* (2013.01); *B01D 53/9472* (2013.01);
(Continued)

(58) Field of Classification Search
CPC . B01J 35/04; B01J 23/10; B01J 23/626; B01J 23/6562; B01J 23/46; B01J 29/7015;
(Continued)

(56) References Cited

U.S. PATENT DOCUMENTS 8,568,674 B1 10/2013 Sung et al.
2007/0238605 A1 10/2007 Strehlau et al.
(Continued)

FOREIGN PATENT DOCUMENTS

CN  2017/019958 A1  2/2017
CN  108136373 A  6/2018
(Continued)

OTHER PUBLICATIONS

European Search Report for EP Patent Application No. 20773823.8, dated Oct. 31, 2022, 8 pages.
(Continued)

*Primary Examiner* — Timothy C Vanoy
(74) *Attorney, Agent, or Firm* — DLA Piper LLP (US)

(57) ABSTRACT

The present disclosure is directed to a low temperature carbon monoxide (LT-CO) oxidation catalyst composition for abatement of exhaust gas emissions from a lean burn engine. The LT-CO oxidation catalyst composition includes an oxygen storage component (OSC), a first platinum group metal (PGM) component, and a promoter metal, wherein the OSC is impregnated with the first PGM component and the promoter metal and the LT-CO oxidation catalyst composition is effective for oxidizing carbon monoxide (CO) and hydrocarbons (HC) under cold start conditions. Further provided are catalytic articles including the LT-CO oxidation catalyst composition, which may optionally further include a diesel oxidation catalyst (DOC) composition (giving an LT-CO/DOC article). Further provided is an exhaust gas treatment system including such catalytic articles, and meth-
(Continued)

ods for reducing a HC or CO level in an exhaust gas stream using such catalytic articles.

25 Claims, 26 Drawing Sheets

(51) Int. Cl.
*B01J 23/10* (2006.01)
*B01J 35/00* (2006.01)
*B01J 37/03* (2006.01)
*B01J 29/70* (2006.01)
*B01J 29/46* (2006.01)
*B01J 29/80* (2006.01)
*B01J 23/656* (2006.01)
*B01D 53/94* (2006.01)
*F01N 3/022* (2006.01)
*F01N 3/28* (2006.01)
*F01N 3/10* (2006.01)
*F01N 3/20* (2006.01)

(52) U.S. Cl.
CPC ............ *B01J 23/10* (2013.01); *B01J 23/626* (2013.01); *B01J 23/6562* (2013.01); *B01J 29/46* (2013.01); *B01J 29/7015* (2013.01); *B01J 29/80* (2013.01); *B01J 35/0006* (2013.01); *B01J 37/038* (2013.01); *F01N 3/0222* (2013.01); *F01N 3/103* (2013.01); *F01N 3/2066* (2013.01); *F01N 3/2803* (2013.01); *B01D 2255/1021* (2013.01); *B01D 2255/1023* (2013.01); *B01D 2255/2042* (2013.01); *B01D 2255/2065* (2013.01); *B01D 2255/2094* (2013.01); *B01D 2255/502* (2013.01); *B01D 2255/908* (2013.01); *B01D 2255/9022* (2013.01); *B01D 2255/9155* (2013.01); *F01N 2370/04* (2013.01); *F01N 2610/02* (2013.01); *F01N 2610/1453* (2013.01)

(58) Field of Classification Search
CPC ... B01J 35/0006; B01J 37/038; B01D 53/944; B01D 53/9472; B01D 2255/1021; B01D 2255/1023; B01D 2255/2042; B01D 2255/2065; B01D 2255/2094; B01D 2255/502; B01D 2255/9022; B01D 2255/908; B01D 2255/9155; F01N 3/0222; F01N 3/103; F01N 3/2066; F01N 3/2803; F01N 2370/04; F01N 2610/02; F01N 2610/1453
See application file for complete search history.

(56) References Cited

U.S. PATENT DOCUMENTS

| | | |
|---|---|---|
| 2010/0166629 A1 | 7/2010 | Deeba |
| 2010/0183490 A1 | 7/2010 | Hoke et al. |
| 2010/0257843 A1 | 10/2010 | Hoke et al. |
| 2011/0020201 A1 * | 1/2011 | Luo ............... B01J 37/0244 252/186.1 |
| 2019/0060833 A1 | 2/2019 | Hoke et al. |

FOREIGN PATENT DOCUMENTS

| | | | |
|---|---|---|---|
| CN | 109312651 A | 2/2019 | |
| CN | 109414649 A | 3/2019 | |
| WO | WO 2016 210 221 A1 * | 12/2016 | ............... F01N 3/10 |
| WO | 2017/180114 A1 | 10/2017 | |
| WO | 2017/187344 A1 | 11/2017 | |
| WO | WO 2017/216728 A1 | 12/2017 | |

OTHER PUBLICATIONS

Wang, C. et al., Pd supported on Sn02-Mn0x-Ce02 catalysts for low temperature CO oxidation, Catalyst Today vol. 258, Dec. 1, 2015, pp. 481-486.
International Search Report dated Jun. 30, 2020, PCT/IB2020/052543.
Extended European Search Report dated Nov. 8, 2022, of counterpart European Patent Application No. 20773823.8.
Communication Pursuant to Rules 70(2) and 70a(2) EPC dated Nov. 25, 2022, of counterpart European Patent Application No. 20773823.8.
Examination Report dated Jun. 19, 2023, of counterpart Indian Patent Application No. 202127046496.
First Office Action dated Aug. 15, 2023, from counterpart Chinese Patent Application No. 202080021750.0, along with its English translation.

* cited by examiner

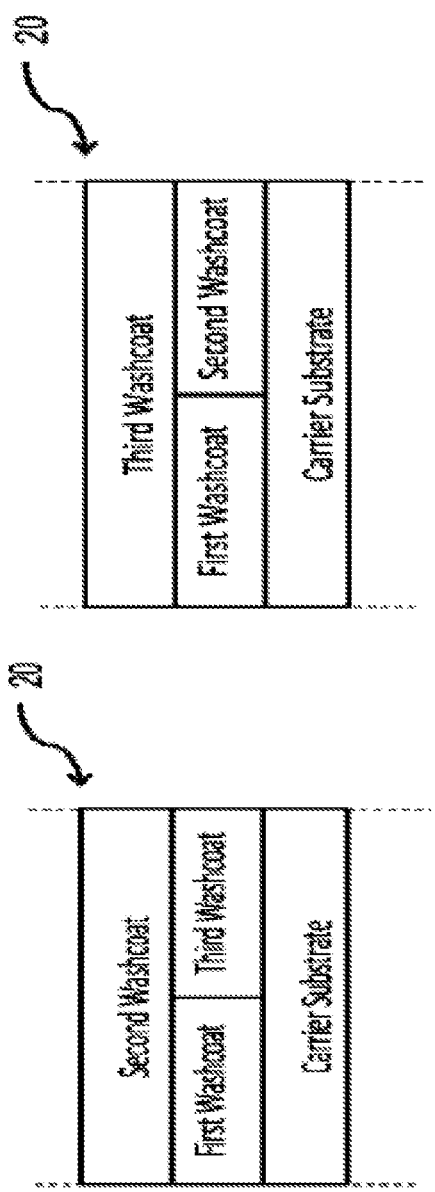
FIG. 4E
FIG. 4F
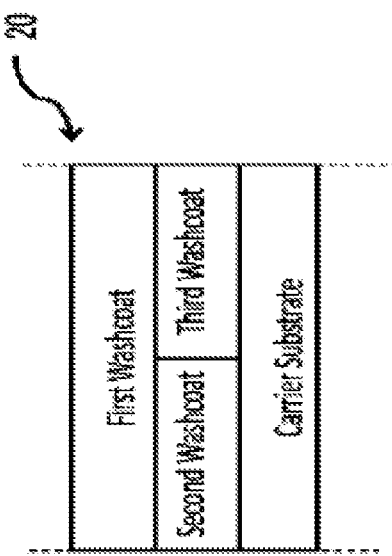
FIG. 4G

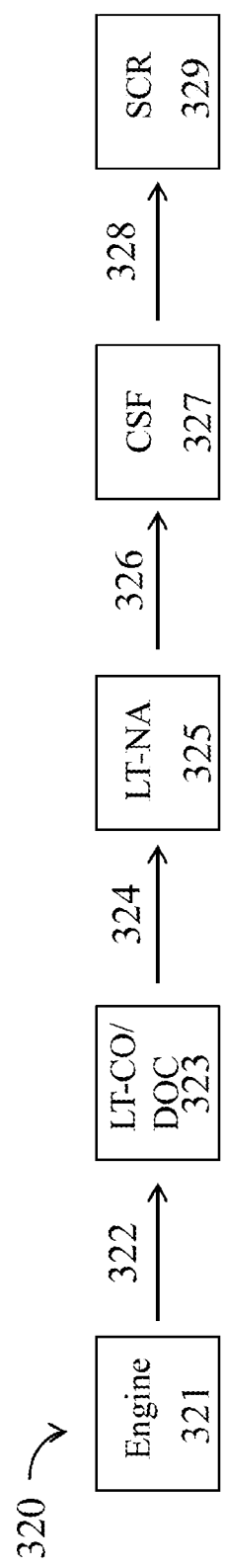
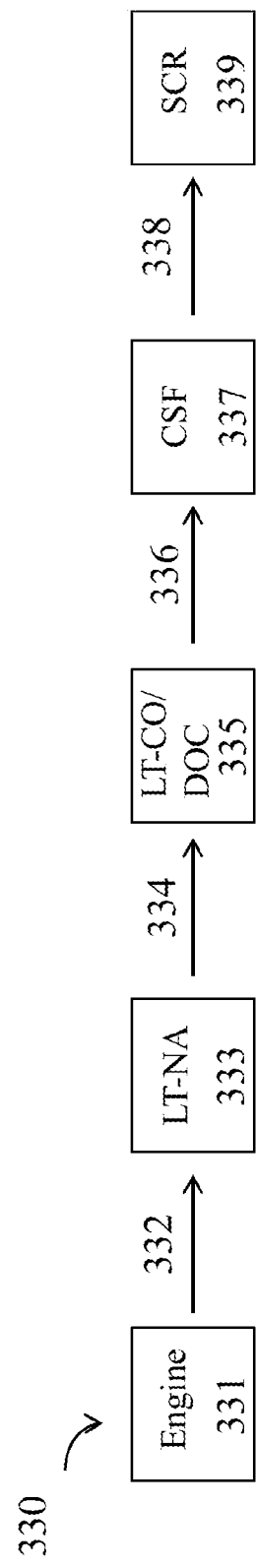
FIG. 5A
FIG. 5B

LOW TEMPERATURE CO OXIDATION CATALYST

This application is a national phase application filed under 35 U.S.C. § 371 based on International Patent Application No. PCT/IB2020/052543, which was filed on Mar. 19, 2020, which claims the benefit of U.S. Provisional Application No. 62/820,916, filed Mar. 20, 2019; the contents of each application is incorporated herein by reference.

FIELD OF THE INVENTION

The present invention is directed to catalytic compositions, articles, systems, and methods suitable for treating exhaust gas streams of lean burn internal combustion engines to reduce emissions of carbon monoxide (CO).

BACKGROUND OF THE INVENTION

Environmental regulations for emissions of internal combustion engines are becoming increasingly stringent throughout the world. Operation of a lean-burn engine, for example a diesel engine, provides the user with excellent fuel economy due to its operation at high air/fuel ratios under fuel-lean conditions. However, diesel engines also emit exhaust gas emissions containing particulate matter (PM), unburned hydrocarbons (HCs), carbon monoxide (CO), and nitrogen oxides ($NO_x$), wherein $NO_x$ describes various chemical species of nitrogen oxides, including nitrogen monoxide and nitrogen dioxide, among others. The two major components of exhaust particulate matter are the soluble organic fraction (SOF) and the insoluble carbonaceous soot fraction. The SOF condenses on the soot in layers and is generally derived from unburned diesel fuel and lubricating oils. The SOF can exist in diesel exhaust either as a vapor or as an aerosol (i.e., fine droplets of liquid condensate), depending on the temperature of the exhaust gas. Soot is predominately composed of particles of carbon.

Oxidation catalysts comprising a precious metal, such as one or more platinum group metals (PGMs), dispersed on a refractory metal oxide support, such as alumina, are known for use in treating the exhaust of diesel engines in order to convert both hydrocarbon and carbon monoxide gaseous pollutants by catalyzing the oxidation of these pollutants to carbon dioxide and water. Such catalysts have been generally contained in units called diesel oxidation catalysts (DOC), which are placed in the exhaust flow path from diesel engines to treat the exhaust before it vents to the atmosphere. Typically, the diesel oxidation catalysts are formed on ceramic or metallic substrates upon which one or more catalyst coating compositions are deposited. In addition to the conversion of gaseous HC and CO emissions and particulate matter (SOF portion), oxidation catalysts that contain one or more PGMs promote the oxidation of NO to $NO_2$. Catalysts are typically defined by their light-off temperature or the temperature at which 50% conversion is attained, also called $T_{50}$.

A major problem encountered in the treatment of automotive exhaust gas streams is the so-called "cold start" period, which is the time period at the beginning of the treatment process, when the exhaust gas stream and the exhaust gas treatment system are at low temperatures (i.e., below 150° C.). At these low temperatures, exhaust gas treatment systems generally do not display sufficient catalytic activity for effectively treating hydrocarbons (HC), nitrogen oxides ($NO_x$) and/or carbon monoxide (CO) emissions. As vehicle manufacturers seek to meet long term worldwide fuel economy standards, the engine exhaust temperature is expected to decline significantly, thereby challenging catalysts to function at lower and lower temperature to efficiently oxidize CO, HC and reduce $NO_x$. Therefore, oxidation catalysts with lower light-off temperatures for CO and HC will be required. Accordingly, there remains a need for catalysts with lower light-off temperatures for improved cold start performance.

SUMMARY OF THE INVENTION

The present disclosure generally provides low temperature carbon monoxide (LT-CO) oxidation catalyst compositions, catalytic articles, and catalyst systems comprising such catalytic articles which exhibit enhanced HC and CO oxidation under low temperature conditions, such as those encountered during a cold start. In particular, such LT-CO oxidation catalyst compositions, articles and systems comprise an oxygen storage component (OSC), a platinum group metal (PGM) component, and a promoter metal wherein the OSC is impregnated with the PGM component and the promoter metal. It has surprisingly been found that impregnating the OSC with both a PGM and a promoter metal provides a catalyst composition with improved cold start performance, as will be described in further detail herein.

Accordingly, in one aspect is provided a LT-CO oxidation catalyst composition for abatement of exhaust gas emissions from a lean burn engine, the LT-CO oxidation catalyst composition comprising an oxygen storage component (OSC), a first platinum group metal (PGM) component, and a first promoter metal; wherein the OSC is impregnated with the first PGM component and the first promoter metal; and wherein the LT-CO oxidation catalyst composition is effective for oxidizing carbon monoxide and hydrocarbons under cold start conditions.

In some embodiments, the first PGM component (impregnated in the OSC) is present in an amount of from about 1 to about 10% by weight of the OSC alone (i.e., the OSC prior to being impregnated with the first PGM component and the promoter metal). In some embodiments, the first PGM component is present in an amount of from about 1 to about 4% by weight of the OSC alone. In some embodiments, the first PGM component comprises palladium (Pd), e.g., the first PGM component can be Pd. In some embodiments, the first PGM component comprises platinum (Pt), e.g., the first PGM component can be Pt. In some embodiments, the OSC comprises a rare earth metal oxide in an amount in the range of about 0.1 to about 100 weight percent, based on the total weight of the OSC alone. In some embodiments, the rare earth metal oxide is ceria.

In some embodiments, the LT-CO oxidation catalyst composition further comprises a first refractory metal oxide selected from the group consisting of alumina, silica, zirconia, titania, yttria, and combinations thereof.

In some embodiments, the LT-CO oxidation catalyst composition further comprises a zeolite. In some embodiments, the first zeolite comprises one or more small pore zeolites having a 6 to 8 membered ring structure. In some embodiments, the one or more small pore zeolites are selected from the group consisting of chabazite (CHA), zeolite A (LTA), and combinations thereof. In some embodiments, the first zeolite comprises one or more medium or large pore zeolites having a 10 to 12 membered ring structure. In some embodiments, the one or more medium or large pore zeolites are selected from the group consisting of ferrierite (FER), ZSM-5 (MFI), beta zeolite (BEA), Y zeolite (FAU), and combinations thereof.

In some embodiments, the LT-CO oxidation catalyst composition further comprises an alkaline earth metal component. In some embodiments, the alkaline earth metal component is an oxide of magnesium, calcium, strontium, barium, or a combination thereof.

In some embodiments, the first promoter metal (impregnated in the OSC) is present in an amount of from about 0.1 to about 10% by weight of the OSC alone, calculated on a metal oxide basis. In some embodiments, the first promoter metal is present in an amount of from about 0.5 to about 4% by weight of the OSC alone, calculated on a metal oxide basis. In some embodiments, the first promoter metal is present in an amount of from about 2 to about 4% by weight of the OSC alone, calculated on a metal oxide basis. In some embodiments, the first promoter metal is tin (Sn). In some embodiments, the OSC comprises ceria (e.g., may consist essentially of ceria); the first PGM component is Pd, Pt, or a combination thereof; and the first promoter metal is Sn. In particular embodiments, the first PGM component is present at about 2 wt % and the Sn is present at about 1 wt % based on the total weight of the OSC alone.

In some embodiments is provided a catalytic article comprising a substrate having an inlet end and an outlet end defining an overall length; and a first washcoat comprising the LT-CO oxidation catalyst composition of the present disclosure disposed on at least a portion thereof. In some embodiments, the catalytic article further comprises a diesel oxidation catalyst (DOC) composition, the DOC composition comprising a second washcoat comprising a second zeolite, wherein the second zeolite is impregnated with a second PGM component; and a third washcoat comprising a third zeolite and a second refractory metal oxide, wherein third zeolite, or the second refractory metal oxide, or both, are impregnated with a third PGM component.

In some embodiments, the second refractory metal oxide is impregnated with a promoter metal.

In some embodiments, the second PGM component comprises Pt, Pd, or a combination thereof. In some embodiments, the second PGM component comprises Pt. In some embodiments, the second PGM component comprises Pt and Pd. In some embodiments, the Pt and the Pd are present in a weight ratio of from about 1:10 to about 10:1 Pt:Pd. In some embodiments, the third PGM component comprises Pt, Pd, or a combination thereof.

In some embodiments, the second zeolite and the third zeolite each comprise a hydrothermally stable zeolite in the form of 6- to 12-membered ring structure. In some embodiments, each of the second zeolite and the third zeolite are independently selected from the group consisting of ZSM-5, beta, mordenite, Y zeolite, chabazite, ferrierite, and combinations thereof. In some embodiments, the second zeolite comprises more than one zeolite. In some embodiments, the third zeolite comprises more than one zeolite. In some embodiments, both the second and the third zeolite comprise more than one zeolite.

In some embodiments, wherein the catalytic article comprises three (or more) layers, the first, second and third washcoats of the catalytic article are layered or zoned. In some embodiments, the first washcoat is coated on the substrate, the second washcoat is coated on top of the first washcoat, and the third washcoat is coated on top of the second washcoat. In some embodiments, the third washcoat is coated on the substrate, the second washcoat is coated on top of the third washcoat, and the first washcoat is coated on top of the second washcoat. In some embodiments, the first washcoat is coated on the substrate, the third washcoat is coated on top of the first washcoat, and the second washcoat is coated on top of the third washcoat. In some embodiments, the second washcoat is coated on the inlet end of the substrate, the third washcoat is coated on the outlet end of the substrate, and the first washcoat is coated on top of the second washcoat and the third washcoat.

In some embodiments, the catalytic article has a zoned configuration, wherein the first washcoat is disposed on the substrate from either the inlet end or the outlet end to a length of from about 10% to about 90% of the overall length; the second washcoat is disposed on the catalyst substrate from either the inlet end or the outlet end to a length from about 90% to about 10% of the overall length; and the third washcoat is coated on top of the first washcoat and the second washcoat. In some embodiments, the first washcoat is present on the substrate with a loading of at least about 0.5 g/in$^3$. In some embodiments, the substrate is a honeycomb substrate in the form of a wall-flow filter or a flow-through monolith.

In another aspect is provided a catalytic article for abatement of exhaust gas emissions from a lean burn engine, the catalytic article comprising a substrate having an inlet end and an outlet end defining an overall length; a first washcoat comprising an oxygen storage component (OSC), a first platinum group metal (PGM) component, and a first promoter metal, and optionally a first refractory metal oxide, wherein the OSC is impregnated with the first PGM component and the first promoter metal; a second washcoat comprising a first zeolite, wherein the first zeolite is impregnated with a second PGM component; and a third washcoat comprising a second zeolite and a second refractory metal oxide, wherein the second zeolite, the second refractory metal oxide, or both, are impregnated with a third PGM component and optionally a second promoter metal, wherein each of the first, second, and third washcoats are disposed on at least a portion of the substrate in a layered or zoned configuration; and wherein the catalytic article is effective for oxidizing carbon monoxide and hydrocarbons under cold start conditions.

In some embodiments, the first washcoat further comprises a small pore zeolite, a large pore zeolite, an alkaline earth metal component, or a combination thereof.

In some embodiments, the cold start conditions comprise an exhaust gas temperature that is below about 150° C.

In some embodiments, the LT-CO oxidation catalytic article further comprises a HC trap composition. In some embodiments, the LT-CO oxidation catalytic article further comprises a low temperature $NO_x$ adsorber (LT-NA) composition. In some embodiments, the LT-CO oxidation catalytic article further comprises a lean $NO_x$ trap (LNT) composition.

In some embodiments is provided an exhaust gas treatment system for treatment of a lean burn engine exhaust gas stream comprising hydrocarbons, carbon monoxide, nitrogen oxides, and particulate matter, the exhaust gas treatment system comprising a lean burn engine producing an exhaust gas stream; an exhaust conduit in fluid communication with the lean burn engine via an exhaust manifold; and the catalytic article of the present disclosure positioned downstream from the lean burn engine and in fluid communication with the exhaust gas stream. In some embodiments, the exhaust gas treatment system further comprises one or more additional components selected from the group consisting of a soot filter, a selective catalytic reduction (SCR) catalyst, a urea injection component, an ammonia oxidation catalyst (AMOX), a low-temperature $NO_x$ absorber (LT-NA) catalyst, and a lean $NO_x$ trap (LNT). In some embodiments, the lean burn engine is a diesel engine.

In some embodiments is provided a method for treating a lean burn engine exhaust gas stream, the method comprising contacting the exhaust gas stream with the catalytic article of the present disclosure or the exhaust gas treatment system of the present disclosure.

In some embodiments is provided a method for reducing CO and HC levels in an exhaust gas stream, the method comprising contacting the gas stream with catalytic article of the present disclosure, or the exhaust gas treatment system of the present disclosure, for a time and at a temperature sufficient to reduce the levels of CO and HC in the gas stream. In some embodiments, the CO and HC levels in the gas stream are reduced by at least 30% compared to the CO and HC levels in the gas stream prior to contact with the catalytic article.

The disclosure includes, without limitations, the following embodiments.

Embodiment 1: A low temperature carbon monoxide (LT-CO) oxidation catalyst composition for abatement of exhaust gas emissions from a lean burn engine, the LT-CO oxidation catalyst composition comprising: an oxygen storage component (OSC); a first platinum group metal (PGM) component; and a first promoter metal; wherein the OSC is impregnated with the first PGM component and the first promoter metal; and wherein the LT-CO oxidation catalyst composition is effective for oxidizing carbon monoxide and hydrocarbons under cold start conditions.

Embodiment 2: The LT-CO oxidation catalyst composition of embodiment 1, wherein the first PGM component is present in an amount of from about 1 to about 10% by weight of the OSC alone.

Embodiment 3: The LT-CO oxidation catalyst composition of embodiment 1 or 2, wherein the first PGM component is present in an amount of from about 1 to about 4% by weight of the OSC alone.

Embodiment 4: The LT-CO oxidation catalyst composition of any one of embodiments 1-3, wherein the first PGM component is palladium (Pd).

Embodiment 5: The LT-CO oxidation catalyst composition of any one of embodiments 1-4, wherein the first PGM component is platinum (Pt).

Embodiment 6: The LT-CO oxidation catalyst composition of any one of embodiments 1-5, wherein the OSC comprises a rare earth metal oxide in an amount in the range of about 0.1 to about 100 weight percent, based on the total weight of the OSC alone.

Embodiment 7: The LT-CO oxidation catalyst composition of any one of embodiments 1-6, wherein the rare earth metal oxide is ceria.

Embodiment 8: The LT-CO oxidation catalyst composition of any one of embodiments 1-7, wherein the first promoter metal is present in an amount of from about 0.1 to about 10% by weight of the OSC alone, calculated on a metal oxide basis.

Embodiment 9: The LT-CO oxidation catalyst composition of any one of embodiments 1-8, wherein the first promoter metal is present in an amount of from about 0.5 to about 4% by weight of the OSC alone, calculated on a metal oxide basis.

Embodiment 10: The LT-CO oxidation catalyst composition of any one of embodiments 1-9, wherein the first promoter metal is tin (Sn) or an oxide thereof.

Embodiment 11: The LT-CO oxidation catalyst composition of any one of embodiments 1-10, wherein the OSC is ceria; the first PGM component is Pd, Pt, or a combination thereof; and the first promoter metal is Sn or an oxide thereof.

Embodiment 12: The LT-CO oxidation catalyst composition o of any one of embodiments 1-11, wherein the first PGM component is present at about 2 wt % and the Sn is present at about 1 wt %. %.

Embodiment 13: The LT-CO oxidation catalyst composition of any one of embodiments 1-12, further comprising a first refractory metal oxide selected from the group consisting of alumina, silica, zirconia, titania, yttria, and combinations thereof.

Embodiment 14: The LT-CO oxidation catalyst composition of any one of embodiments 1-13, further comprising a first zeolite.

Embodiment 15: The LT-CO oxidation catalyst composition of any one of embodiments 1-14, wherein the first zeolite comprises one or more small pore zeolites having a 6- to 8-membered ring structure.

Embodiment 16: The LT-CO oxidation catalyst composition of any one of embodiments 1-15, wherein the one or more small pore zeolites are selected from the group consisting of chabazite, zeolite A, and combinations thereof.

Embodiment 17: The LT-CO oxidation catalyst composition of any one of embodiments 1-16, wherein the first zeolite comprises one or more medium or large pore zeolites having a 10- to 12-membered ring structure.

Embodiment 18: The LT-CO oxidation catalyst composition of any one of embodiments 1-17, wherein the one or more medium or large pore zeolites are selected from the group consisting of beta zeolite, Y zeolite, ferrierite, ZSM-5, and combinations thereof.

Embodiment 19: The LT-CO oxidation catalyst composition of any one of embodiments 1-18, further comprising an alkaline earth metal component.

Embodiment 20: The LT-CO oxidation catalyst composition of any one of embodiments 1-19, wherein the alkaline earth metal component is an oxide of magnesium, calcium, strontium, barium, or a combination thereof.

Embodiment 21: A catalytic article comprising: a substrate having an inlet end and an outlet end defining an overall length; and a first washcoat comprising the LT-CO oxidation catalyst composition of any one of embodiments 1-20 disposed on at least a portion of the substrate.

Embodiment 22: The catalytic article of embodiment 21, further comprising a diesel oxidation catalyst (DOC) composition, the DOC composition comprising: a second washcoat comprising a second zeolite, wherein the second zeolite is impregnated with a second PGM component; and a third washcoat comprising a third zeolite and a second refractory metal oxide, wherein third zeolite, the second refractory metal oxide, or both, are impregnated with a third PGM component.

Embodiment 23: The catalytic article of embodiment 21 or 22, wherein the second refractory metal oxide is impregnated with a second promoter metal.

Embodiment 24: The catalytic article of any one of embodiments 21-23, wherein the second PGM component comprises Pt, Pd, or a combination thereof.

Embodiment 25: The catalytic article of any one of embodiments 21-24, wherein the second PGM component comprises Pt and Pd present in a weight ratio of from about 1:10 to about 10:1 Pt:Pd.

Embodiment 26: The catalytic article of any one of embodiments 21-25, wherein the third PGM component comprises Pt, Pd, or a combination thereof.

Embodiment 27: The catalytic article of any one of embodiments 21-26, wherein the second zeolite and the third zeolite each comprise a hydrothermally stable zeolite in the form of a 6- to 12-membered ring structure.

Embodiment 28: The catalytic article of any one of embodiments 21-27, wherein the second zeolite and the third zeolite are each independently selected from the group consisting of ZSM-5, beta, mordenite, Y zeolite, chabazite, ferrierite, and combinations thereof.

Embodiment 29: The catalytic article of any one of embodiments 21-28, wherein the first, second and third washcoats of the catalytic article are layered or zoned.

Embodiment 30: The catalytic article of any one of embodiments 21-29, wherein the first washcoat is coated on the substrate, the second washcoat is coated on top of the first washcoat, and the third washcoat is coated on top of the second washcoat.

Embodiment 31: The catalytic article of any one of embodiments 21-29, wherein the first washcoat is coated on the substrate, the third washcoat is coated on top of the first washcoat, and the second washcoat is coated on top of the third washcoat.

Embodiment 32: The catalytic article of any one of embodiments 21-29, wherein the third washcoat is coated on the substrate, the second washcoat is coated on top of the third washcoat, and the first washcoat is coated on top of the second washcoat.

Embodiment 33: The catalytic article of any one of embodiments 21-29, wherein the second washcoat is coated on the inlet end of the substrate, the third washcoat is coated on the outlet end of the substrate, and the first washcoat is coated on top of the second washcoat and the third washcoat.

Embodiment 34: The catalytic article of any one of embodiments 21-29, having a zoned configuration, wherein the first washcoat is disposed on the substrate from either the inlet end or the outlet end to a length of from about 10% to about 90% of the overall length; the second washcoat is disposed on the substrate from either the inlet end or the outlet end to a length from about 90% to about 10% of the overall length; and the third washcoat is coated on top of the first washcoat and the second washcoat.

Embodiment 35: The catalytic article of any one of embodiments 21-34, wherein the first washcoat is present on the substrate with a loading of at least about 0.5 g/in$^3$.

Embodiment 36: The catalytic article of any one of embodiments 21-35, wherein the substrate is a honeycomb substrate in the form of a wall-flow filter or a flow-through monolith.

Embodiment 37: A catalytic article for abatement of exhaust gas emissions from a lean burn engine, the catalytic article comprising: a substrate having an inlet end and an outlet end defining an overall length; and a first washcoat comprising an oxygen storage component (OSC), a first platinum group metal (PGM) component, a first promoter metal, and optionally a first refractory metal oxide, wherein the OSC is impregnated with the first PGM component and the first promoter metal; a second washcoat comprising a first zeolite, wherein the first zeolite is impregnated with a second PGM component; and a third washcoat comprising a second zeolite and a second refractory metal oxide, wherein the second zeolite, the second refractory metal oxide, or both, are impregnated with a third PGM component and optionally a second promoter metal; wherein each of the first, second, and third washcoats are disposed on at least a portion of the substrate in a layered or zoned configuration; and wherein the catalytic article is effective for oxidizing carbon monoxide and hydrocarbons under cold start conditions.

Embodiment 38: The catalytic article of embodiment 37, wherein the first washcoat further comprises a small pore zeolite, a large pore zeolite, an alkaline earth metal component, or a combination thereof.

Embodiment 39: The catalytic article of any one of embodiments 21-38, wherein the cold start conditions comprise an exhaust gas temperature that is below about 150° C.

Embodiment 40: The catalytic article of any one of embodiments 21-39, further comprising a hydrocarbon (HC) trap composition.

Embodiment 41: The catalytic article of any one of embodiments 21-40, further comprising a low temperature NO$_x$ adsorber (LT-NA) composition.

Embodiment 42: The catalytic article of any one of embodiments 21-41 further comprising a lean NO$_x$ trap (LNT) composition.

Embodiment 43: An exhaust gas treatment system for treatment of a lean burn engine exhaust gas stream comprising hydrocarbons, carbon monoxide, nitrogen oxides, and particulate matter, the exhaust gas treatment system comprising: a lean burn engine producing an exhaust gas stream; an exhaust conduit in fluid communication with the lean burn engine via an exhaust manifold; and the catalytic article of any one of embodiments 21 to 42 positioned downstream from the lean burn engine and in fluid communication with the exhaust gas stream.

Embodiment 44: The exhaust gas treatment system of embodiment 43, further comprising one or more additional components selected from the group consisting of a soot filter, a selective catalytic reduction (SCR) catalyst, a urea injection component, an ammonia oxidation (AMOx) catalyst, a low-temperature NO$_x$ absorber (LT-NA), and a lean NO$_x$ trap (LNT).

Embodiment 45: The exhaust gas treatment system of embodiment 43 or 44, wherein the lean burn engine is a diesel engine.

Embodiment 46: A method for treating a lean burn engine exhaust gas stream, the method comprising contacting the exhaust gas stream with the catalytic article of any one of embodiments 21 to 42, or the exhaust gas treatment system of any one of embodiments 43 to 45.

Embodiment 47: A method for reducing CO and/or HC levels in an exhaust gas stream, the method comprising contacting the exhaust gas stream with the catalytic article of any one of embodiments 21 to 42, or the exhaust gas treatment system of any one of embodiments 43 to 45, for a time and at a temperature sufficient to reduce the levels of CO and/or HC in the gas stream.

Embodiment 48: The method of embodiment 47, wherein the CO and/or HC levels in the exhaust gas stream are reduced by at least 30% compared to the CO and/or HC levels in the gas stream prior to contact with the catalytic article.

These and other features, aspects, and advantages of the disclosure will be apparent from a reading of the following detailed description together with the accompanying drawings, which are briefly described below. The invention includes any combination of two, three, four, or more of the above-noted embodiments as well as combinations of any two, three, four, or more features or elements set forth in this disclosure, regardless of whether such features or elements are expressly combined in a specific embodiment description herein. This disclosure is intended to be read holistically such that any separable features or elements of the disclosed invention, in any of its various aspects and embodiments, should be viewed as intended to be combinable unless the context clearly dictates otherwise. Other aspects and advantages of the present invention will become apparent from the following.

BRIEF DESCRIPTION OF THE DRAWINGS

In order to provide an understanding of embodiments of the invention, reference is made to the appended drawings, in which reference numerals refer to components of exemplary embodiments of the invention. The drawings are exemplary only, and should not be construed as limiting the invention. The disclosure described herein is illustrated by way of example and not by way of limitation in the accompanying figures. For simplicity and clarity of illustration, features illustrated in the figures are not necessarily drawn to scale. For example, the dimensions of some features may be exaggerated relative to other features for clarity. Further, where considered appropriate, reference labels have been repeated among the figures to indicate corresponding or analogous elements.

FIGS. 4A to 4G show cross-sectional views of embodiment of a layered catalytic article of the present disclosure having 3 washcoat layers;

FIG. 5A is a schematic depictions of an embodiment of an exhaust gas treatment system comprising a catalytic article of the present disclosure, wherein the catalytic article is combined with a DOC article (an LT-CO/DOC), and the LT-CO/DOC is located upstream of a Low Temperature NO Absorber (LT-NA), a catalyzed soot filter (CSF), and a selective catalytic reduction (SCR) catalyst component;

FIG. 5B is a schematic depiction of an embodiment of an exhaust gas treatment system comprising a catalytic article of the present disclosure, wherein the catalytic article is combined with a DOC article, and the LT-CO/DOC is located upstream of a CSF and a SCR catalyst component, and downstream of an LT-NA component;

DETAILED DESCRIPTION OF THE INVENTION

Figure 1B:
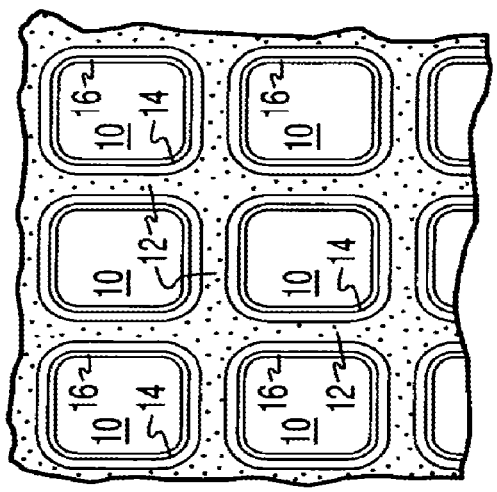
FIG. 1B is a partial cross-sectional view enlarged relative to FIG. 1A and taken along a plane parallel to the end faces of the substrate of FIG. 1A, which shows an enlarged view of a plurality of the gas flow passages shown in FIG. 1, in an embodiment wherein the substrate is a flow-through substrate.

The present disclosure generally provides low temperature CO (LT-CO) oxidation catalyst compositions, catalytic articles, and catalyst systems comprising such catalytic articles suitable for the oxidation of carbon monoxide (CO) and hydrocarbon (HC) emissions from a lean burn engine under cold start conditions. In particular, such articles and systems comprise a LT-CO oxidation catalyst composition for abatement of exhaust gas emissions from a lean burn engine, the catalyst composition comprising an oxygen storage component (OSC), a first platinum group metal (PGM) component, and a promoter metal; wherein the OSC is impregnated with the first PGM component and the promoter metal; and wherein the oxidation catalyst composition is effective for oxidizing CO and HCs under cold start conditions.

The present invention now will be described more fully hereinafter. This invention may, however, be embodied in many different forms and should not be construed as limited to the embodiments set forth herein; rather, these embodiments are provided so that this disclosure will be thorough and complete, and will fully convey the scope of the invention to those skilled in the art.

Definitions

The articles "a" and "an" herein refer to one or to more than one (e.g. at least one) of the grammatical object. Any ranges cited herein are inclusive. The term "about" used throughout is used to describe and account for small fluctuations. For instance, "about" may mean the numeric value may be modified by ±5%, ±4%, ±3%, ±2%, ±1%, ±0.5%, ±0.4%, ±0.3%, ±0.2%, ±0.1% or ±0.05%. All numeric values are modified by the term "about" whether or not explicitly indicated. Numeric values modified by the term "about" include the specific identified value. For example, "about 5.0" includes 5.0.

The term "abatement" means a decrease in the amount, caused by any means.

The term "associated" means for instance "equipped with", "connected to" or in "communication with", for example "electrically connected" or in "fluid communication with" or otherwise connected in a way to perform a function. The term "associated" may mean directly associated with or indirectly associated with, for instance through one or more other articles or elements.

"Average particle size" is synonymous with D50, meaning half of the population of particles has a particle size above this point, and half below. Particle size refers to primary particles. Particle size may be measured by laser light scattering techniques, with dispersions or dry powders, for example according to ASTM method D4464.

The term "catalyst" refers to a material that promotes a chemical reaction. The catalyst includes the "catalytically active species" and the "support" that carries or supports the active species. For example, zeolites may be supports for e.g., platinum group metal (PGM) or base metal active catalytic species. Likewise, refractory metal oxide particles may be a support for platinum group metal catalytic species. The catalytically active species are also termed "promoters" as they promote chemical reactions. For instance, a present PGM-containing zeolite may be termed a PGM-promoted zeolite. A "promoted zeolite" refers to a zeolite to which catalytically active species are intentionally added.

The term "catalytic article" or "catalyst article" in the disclosure means an article comprising a substrate having a catalyst coating composition.

"Crystal size" as used herein means the length of one edge of a face of the crystal, preferably the longest edge, provided that the crystals are not needle-shaped. Direct measurement of the crystal size can be performed using microscopy methods, such as SEM and TEM. For example, measurement by SEM involves examining the morphology of materials at high magnifications (typically 1000× to 10,000×). The SEM method can be performed by distributing a representative portion of the zeolite powder on a suitable mount such that individual particles are reasonably evenly spread out across the field of view at 1000× to 10,000× magnification. From this population, a statistically significant sample of random individual crystals (e.g., 50-200) are examined and the longest dimensions of the individual crystals parallel to the horizontal line of the straight edge are measured and recorded. Particles that are clearly large polycrystalline aggregates are not to be included in the measurements. Based on these measurements, the arithmetic mean of the sample crystal sizes is calculated.

"CSF" refers to a catalyzed soot filter, which is a wall-flow monolith. A wall-flow filter consists of alternating inlet channels and outlet channels, where the inlet channels are plugged on the outlet end and the outlet channels are plugged on the inlet end. A soot-carrying exhaust gas stream entering the inlet channels is forced to pass through the filter walls before exiting from the outlet channels. In addition to soot filtration and regeneration, A CSF may carry oxidation catalysts to oxidize CO and HC to $CO_2$ and $H_2O$, or oxidize NO to $NO_2$ to accelerate the downstream SCR catalysis or to facilitate the oxidation of soot particles at lower temperatures. An SCR catalyst composition can also be coated directly onto a wall-flow filter, which is called SCRoF.

As used herein, the phrase "catalyst system" refers to a combination of two or more catalysts, for example, a combination of a LT-CO oxidation catalyst article and a second catalyst article which may be a diesel oxidation catalyst (DOC), a LNT or a SCR. The catalyst system may alternatively be in the form of a washcoat in which the two catalysts are mixed together or coated as catalyst compositions in separate layers on a single substrate, as in an LT-CO/DOC, LT-CO/LT-NA, or LT-CO/LNT article.

The term "configured" as used in the description and claims is intended to be an open-ended term as are the terms "comprising" or "containing." The term "configured" is not meant to exclude other possible articles or elements. The term "configured" may be equivalent to "adapted."

"DOC" refers to a diesel oxidation catalyst, which converts hydrocarbons and carbon monoxide in the exhaust gas of a diesel engine. Typically, a DOC comprises one or more platinum group metals such as palladium and/or platinum; a support material such as alumina; a zeolite for HC storage; and optionally, promoters and/or stabilizers.

In general, the term "effective" means for example from about 35% to 100% effective, for instance from about 40%, about 45%, about 50% or about 55% to about 60%, about 65%, about 70%, about 75%, about 80%, about 85%, about 90% or about 95%, regarding the defined catalytic activity or storage/release activity, by weight or by moles.

The term "exhaust stream" or "exhaust gas stream" refers to any combination of flowing gas that may contain solid or liquid particulate matter. The stream comprises gaseous components and is for example exhaust of a lean burn engine, which may contain certain non-gaseous components such as liquid droplets, solid particulates and the like. The exhaust gas stream of a combustion engine typically further comprises combustion products ($CO_2$ and $H_2O$), products of incomplete combustion (carbon monoxide (CO) and hydrocarbons (HC)), oxides of nitrogen ($NO_x$), combustible and/or carbonaceous particulate matter (soot), and un-reacted oxygen and nitrogen. As used herein, the terms "upstream" and "downstream" refer to relative directions according to the flow of an engine exhaust gas stream from an engine towards a tailpipe, with the engine in an upstream location and the tailpipe and any pollution abatement articles such as filters and catalysts being downstream from the engine. The inlet end of a substrate is synonymous with the "upstream" end or "front" end. The outlet end is synonymous with the "downstream" end or "rear" end. An upstream zone is upstream of a downstream zone. An upstream zone may be closer to the engine or manifold, and a downstream zone may be further away from the engine or manifold.

The term "in fluid communication" is used to refer to articles positioned on the same exhaust line, i.e., a common exhaust stream passes through articles that are in fluid communication with each other. Articles in fluid communication may be adjacent to each other in the exhaust line. Alternatively, articles in fluid communication may be separated by one or more articles, also referred to as "washcoated monoliths."

The term "functional article" in the invention means an article comprising a substrate having a functional coating composition disposed thereon, in particular a catalyst and/or sorbent coating composition.

As used herein, "impregnated" or "impregnation" refers to permeation of the catalytic material into the porous structure of the support material.

"LNT" refers to a lean $NO_x$ trap, which is a catalyst containing a platinum group metal, ceria, and an alkaline earth trap material suitable to adsorb $NO_x$ during lean conditions (for example, BaO or MgO). Under rich conditions, $NO_x$ is released and reduced to nitrogen.

"LT-NA" refers to a low temperature $NO_x$ adsorber, which is a component containing a composition suitable to adsorb $NO_x$ during low temperature (e.g., cold start) conditions, for example, a palladium-exchanged zeolite material. Under low temperature conditions, $NO_x$ is adsorbed, then released into the exhaust gas stream as the operating temperature of the LT-NA composition increases.

As used herein, the term "molecular sieves," such as zeolites and other zeolitic framework materials (e.g. isomorphously substituted materials), refers to materials that may, in particulate form, support catalytic PGMs or other catalytic metals. Molecular sieves are materials based on an extensive three-dimensional network of oxygen ions containing generally tetrahedral type sites and having a substantially uniform pore distribution, with the average pore size being no larger than 20 Angstroms (Å).

The terms "on" and "over" in reference to a coating layer may be used synonymously. The term "directly on" means in direct contact with. The disclosed articles are referred to in certain embodiments as comprising one coating layer "on" a second coating layer, and such language is intended to encompass embodiments with intervening layers, where direct contact between the coating layers is not required (i.e., "on" is not equated with "directly on").

As used herein, the term "selective catalytic reduction" (SCR) refers to the catalytic process of reducing oxides of nitrogen to dinitrogen ($N_2$) using a nitrogenous reductant.

As used herein, the terms "nitrogen oxides" or "$NO_x$" designate the oxides of nitrogen, such as NO, $NO_2$ or $N_2O$.

"Substantially free" means "little or no" or "no intentionally added" and also having only trace and/or inadvertent amounts. For instance, in certain embodiments, "substantially free" means less than 2 wt % (weight %), less than 1.5 wt %, less than 1.0 wt %, less than 0.5 wt %, 0.25 wt % or less than 0.01 wt %, based on the weight of the indicated total composition.

As used herein, the term "substrate" refers to the monolithic material onto which the catalyst composition, that is, catalytic coating, is disposed, typically in the form of a washcoat. In one or more embodiments, the substrates are flow-through monoliths and monolithic wall-flow filters. Flow-through and wall-flow substrates are also taught, for example, in International Application Publication No. WO2016/070090, which is incorporated herein by reference. A washcoat is formed by preparing a slurry containing a specified solids content (e.g., 30-90% by weight) of catalyst in a liquid, which is then coated onto a substrate and dried to provide a washcoat layer. Reference to "monolithic substrate" means a unitary structure that is homogeneous and continuous from inlet to outlet. A washcoat is formed by preparing a slurry containing a certain solid content (e.g., 20%-90% by weight) of particles in a liquid vehicle, which is then coated onto a substrate and dried to provide a washcoat layer.

As used herein, the term "support" refers to any high surface area material, usually a metal oxide material, upon which a catalytic precious metal is applied.

As used herein, the term "washcoat" has its usual meaning in the art of a thin, adherent coating of a catalytic or other material applied to a substrate material, such as a honeycomb-type substrate, which is sufficiently porous to permit the passage of the gas stream being treated. The washcoat containing the metal-promoted molecular sieve of the invention can optionally comprise a binder selected from silica, alumina, titania, zirconia, ceria, or a combination thereof. The loading of the binder is about 0.1 to 10 wt % based on the weight of the washcoat. As used herein and as described in Heck, Ronald and Farrauto, Robert, Catalytic Air Pollution Control, New York: Wiley-Interscience, 2002, pp. 18-19, a washcoat layer includes a compositionally distinct layer of material disposed on the surface of a monolithic substrate or an underlying washcoat layer. A substrate can contain one or more washcoat layers, and each washcoat layer can be different in some way (e.g., may differ in physical properties thereof such as, for example particle size or crystallite phase) and/or may differ in the chemical catalytic functions.

"Weight percent (wt %)," if not otherwise indicated, is based on an entire composition free of any volatiles, that is, based on dry solids content. Unless otherwise indicated, all parts and percentages are by weight.

As used herein, the term "zeolite" refers to a specific example of a molecular sieve, further including silicon and aluminum atoms. Generally, a zeolite is defined as an aluminosilicate with an open 3-dimensional framework structure composed of corner-sharing $TO_4$ tetrahedra, where T is Al or Si, or optionally P. Cations that balance the charge of the anionic framework are loosely associated with the framework oxygens, and the remaining pore volume is filled with water molecules. The non-framework cations are generally exchangeable, and the water molecules removable.

Aluminosilicate zeolite structures do not include phosphorus or other metals isomorphically substituted in the framework. That is, "aluminosilicate zeolite" excludes aluminophosphate materials such as SAPO, AlPO and MeAlPO materials, while the broader term "zeolite" includes aluminosilicates and aluminophosphates. For the purposes of this disclosure, SAPO, AlPO, and MeAlPO materials are considered non-zeolitic molecular sieves.

A present zeolite, independently, may comprise $SiO_4$/$AlO_4$ tetrahedra that are linked by common oxygen atoms to form a three-dimensional network. The molar ratio of silica-to-alumina ("SAR") of a present zeolite can vary over a wide range, but is generally 2 or greater. For instance, a present zeolite may have a SAR of from about 5 to about 1000.

Zeolites can be differentiated mainly according to the geometry of the voids which are formed by the rigid network of the ($SiO_4$)/$AlO_4$ tetrahedra. The entrances to the voids are formed from 6, 8, 10, or 12 ring atoms with respect to the atoms which form the entrance opening.

Zeolites are comprised of secondary building units (SBU) and composite building units (CBU), and appear in many different framework structures. Secondary building units contain up to 16 tetrahedral atoms and are non-chiral. Composite building units are not required to be achiral, and cannot necessarily be used to build the entire framework. For example, a group of zeolites have a single 4-ring (s4r) composite building unit in their framework structure. In the 4-ring, the "4" denotes the positions of tetrahedral silicon and aluminum atoms, and the oxygen atoms are located in between tetrahedral atoms. Other composite building units include, for example, a single 6-ring (s6r) unit, a double 4-ring (d4r) unit, and a double 6-ring (d6r) unit. The d4r unit is created by joining two s4r units. The d6r unit is created by joining two s6r units. In a d6r unit, there are twelve tetrahedral atoms.

Typically, any framework type of zeolite can be used, such as framework types of ABW, ACO, AEI, AEL, AEN, AET, AFG, AFI, AFN, AFO, AFR, AFS, AFT, AFX, AFY, AHT, ANA, APC, APD, AST, ASV, ATN, ATO, ATS, ATT, ATV, AVL, AWO, AWW, BCT, BEA, BEC, BIK, BOG, BPH, BRE, CAN, CAS, SCO, CFI, SGF, CGS, CHA, CHI, CLO, CON, CZP, DAC, DDR, DFO, DFT, DOH, DON, EAB, EDI, EEI, EMT, EON, EPI, ERI, ESV, ETR, EUO, FAU, FER, FRA, GIS, GIU, GME, GON, GOO, HEU, IFR, IFY, IHW, IRN, ISV, ITE, ITH, ITW, IWR, IWW, JBW, KFI, LAU, LEV, LIO, LIT, LOS, LOV, LTA, LTL, LTN, MAR, MAZ, MEI, MEL, MEP, MER, MFI, MFS, MON, MOR, MOZ, MSO, MTF, MTN, MTT, MTW, MWF, MWW, NAB, NAT, NES, NON, NPO, NPT, NSI, OBW, OFF, OSI, OSO, OWE, PAR, PAU, PHI, PON, RHO, RON, RRO, RSN, RTE, RTH, RUT, RWR, RWY, SAO, SAS, SAT, SAV, SBE, SBS, SBT, SFE, SFF, SFG, SFH, SFN, SFO, SFW, SGT, SOD, SOS, SSY, STF, STI, STT, TER, THO, TON, TSC, UEI, UFI, UOZ, USI, UTL, VET, VFI, VNI, VSV, WIE, WEN, YUG, ZON, or combinations thereof.

For example, a present zeolite may comprise a framework type selected from the group consisting of AEI, BEA (beta zeolites), CHA (chabazite), FAU (zeolite Y), FER (ferrierite), MFI (ZSM-5) and MOR (mordenite). Non-limiting examples of zeolites having the AEI, BEA, CHA, FAU, FER, MFI or MOR structures include chabazite, faujasite, zeolite Y, ultrastable zeolite Y, beta zeolite, mordenite, silicalite, zeolite X, and ZSM-5.

For example, a present zeolite can have the chabazite crystal structure, which is also referred to as the CHA structure by the International Zeolite Association. Zeolitic CHA-framework type molecular sieves include a naturally occurring tectosilicate mineral of a zeolite group with approximate formula: $(Ca, Na_2, K_2, Mg)Al_2Si_4O_{12} \cdot 6H_2O$ (e.g., a hydrated aluminum silicate). Three synthetic forms of zeolitic chabazite are described in "Zeolite Molecular Sieves," by D. W. Breck, published in 1973 by John Wiley & Sons, which is hereby incorporated by reference. The three synthetic forms reported by Breck are Zeolite K-G, described in J. Chem. Soc., p. 2822 (1956), Barrer et. al.; Zeolite D, described in British Patent No. 868,846 (1961); and Zeolite R, described in U.S. Pat. No. 3,030,181, which are hereby incorporated by reference. Synthesis of another synthetic form of zeolitic chabazite, SSZ-13, is described in U.S. Pat. No. 4,544,538. Synthesis of a synthetic form of a non-zeolitic molecular sieve having the chabazite crystal structure, silicoaluminophosphate 34 (SAPO-34), is described in U.S. Pat. Nos. 4,440,871 and 7,264,789, each of which is incorporated by reference here in its entirety. A method of making yet another synthetic non-zeolitic molecular sieve having chabazite structure, SAPO-44, is described for instance in U.S. Pat. No. 6,162,415, which is incorporated by reference here in its entirety.

Zeolites are crystalline materials having rather uniform pore sizes which, depending upon the type of zeolite and the type and amount of cations included in the zeolite lattice, range from about 3 to 10 Angstroms in diameter. The pore sizes are defined by the ring size. As used herein, the term "small pore" refers to pore openings which are smaller than about 5 Angstroms, for example on the order of ~3.8 Angstroms.

A small pore zeolite contains channels defined by up to eight tetrahedral atoms. The phrase "8-ring" zeolite refers to a zeolite having 8-ring pore openings and double-six ring secondary building units and having a cage like structure resulting from the connection of double six-ring building units by 4 rings.

Exemplary small pore zeolites include framework types ACO, AEI, AEN, AFN, AFT, AFX, ANA, APC, APD, ATT, CDO, CHA, DDR, DFT, EAB, EDI, EPI, ERI, GIS, GOO, IHW, ITE, ITW, LEV, KFI, MER, MON, NSI, OWE, PAU, PHI, RHO, RTH, SAT, SAV, SIV, THO, TSC, UEI, UFI, VNI, YUG, ZON and mixtures or intergrowths thereof.

A medium pore zeolite contains channels defined by ten-membered rings. Exemplary medium pore zeolites include framework types AEL, AFO, AHT, BOF, BOZ, CGF, CGS, CHI, DAC, EUO, FER, HEU, IMF, ITH, ITR, JRY, JSR, JST, LAU, LOV, MEL, MFI, MFS, MRE, MTT, MVY, MWW, NAB, NAT, NES, OBW, PAR, PCR, PON, PUN, RRO, RSN, SFF, SFG, STF, STI, STT, STW, SVR, SZR, TER, TON, TUN, UOS, VSV, WEI, WEN and mixtures or intergrowths thereof.

A large pore zeolite contains channels defined by twelve-membered rings. Exemplary large pore zeolites include framework types AFI, AFR, AFS, AFY, ASV, ATO, ATS, BEA, BEC, BOG, BPH, BSV, CAN, CON, CZP, DFO, EMT, EON, EZT, FAU, GME, GON, IFR, ISV, ITG, IWR, IWS, IWV, IWW, JSR, LTF, LTL, MAZ, MEI, MOR, MOZ, MSE, MTW, NPO, OFF, OKO, OSI, RON, RWY, SAF, SAO, SBE, SBS, SBT, SEW, SFE, SFO, SFS, SFV, SOF, SOS, STO, SSF, SSY, USI, UWY, VET and mixtures or intergrowths thereof.

All methods described herein can be performed in any suitable order unless otherwise indicated herein or otherwise clearly contradicted by context. The use of any and all examples, or exemplary language (e.g., "such as") provided herein, is intended merely to better illuminate the materials and methods and does not pose a limitation on the scope unless otherwise claimed. No language in the specification should be construed as indicating any non-claimed element as essential to the practice of the disclosed materials and methods.

All U.S. patent applications, Pre-Grant publications and patents referred to herein are hereby incorporated by reference in their entireties.

LT-CO Oxidation Catalyst Compositions

The present disclosure provides LT-CO oxidation catalyst compositions comprising an oxygen storage component (OSC), a first platinum group metal (PGM) component, and a first promoter metal, wherein the OSC is impregnated with the first PGM component and the first promoter metal, and wherein the LT-CO oxidation catalyst composition is effective for oxidizing carbon monoxide and hydrocarbons under cold start conditions.

Oxygen Storage Component

As used herein, oxygen storage component (OSC) refers to an entity that has multi-valent oxidation states and that can actively react with oxidants such as oxygen ($O_2$) or nitrogen oxides ($NO_x$) under oxidizing conditions, or with reductants such as carbon monoxide (CO), hydrocarbons (HC), or hydrogen ($H_2$) under reducing conditions. Certain exemplary OSCs are rare earth metal oxides, which refers to one or more oxides of scandium, yttrium, and the lanthanum series defined in the Periodic Table of Elements. In some embodiments, the OSC comprises a rare earth metal oxide in an amount in the range of about 0.1 to about 100 weight percent, based on the weight of the OSC alone. By "weight of the OSC alone" is meant the weight of the OSC not including any further components such as a PGM or promoter metal (i.e., the weight of OSC prior to impregnation with a first PGM or promoter metal). Accordingly, it is contemplated that the OSC may comprise a mixture of more than one metal oxide, e.g., one or more rare earth metal oxides. In some embodiments, the OSC consists of a single rare earth metal oxide (i.e., 100 weight percent). In some embodiments, the OSC comprises ceria in combination with one or more other oxides including, for example, oxides of zirconium (Zr), titanium (Ta), lanthanum (La), praseodymium (Pr), neodymium (Nd), niobium (Nb), yttrium (Y), samarium (Sm), gadolinium (Gd), and combinations comprising at least two of the foregoing metals. Such combinations may be referred to as mixed oxide composites. For example, a "ceria-zirconia composite" means a composite comprising ceria and zirconia, without specifying the amount of either component. Suitable ceria-zirconia composites include, but are not limited to, composites having a ceria content ranging from about 5% to about 95%, preferably from about 5% to about 75%, more preferably from about 10% to about 70% by weight based on the total weight of the ceria-zirconia composite (e.g., at least about 5%, at least about 10%, at least about 20%, at least 30%, at least 40%, at least 50%, at least 60%, at least 70%, at least 80%, at least 90%, or at least about 95% ceria). In some embodiments, the OSC is 100% ceria. In some embodiments, the ceria has a high surface area. As used herein, "high surface area ceria" is defined as a ceria having a surface area greater than 60 $m^2/g$ in the fresh state (i.e., it has not been hydrothermally treated under high temperatures).

Platinum Group Metal

As used herein, "PGM" refers to a platinum group metal. Platinum group metals include platinum (Pt), palladium (Pd), ruthenium (Ru), rhodium (Rh), osmium (Os), iridium (Ir), and mixtures thereof. As used herein "PGM component" refers to a platinum group metal, or a compound or complex thereof, which, upon calcination or use of the catalyst, decomposes or otherwise converts to a catalytically active form, usually the metal or the respective metal oxide. For example, the PGM may be in metallic form, with zero valence, or the PGM may be in an oxide form. The PGM components can include the PGM in any valence state. In some embodiments, the PGM component is a metal or an oxide thereof (e.g., including, but not limited to, platinum or an oxide thereof).

In certain embodiments, the first PGM component comprises a combination of platinum group metals, e.g., platinum and palladium. Exemplary weight ratios for such combinations include weight ratios of about 1:10 to about 10:1 Pt:Pd, more typically equal to or greater than about 1:1 Pt:Pd, equal to or greater than about 1.5:1 Pt:Pd, or equal to or greater than about 2:1 Pt:Pd. In other embodiments, the first PGM component includes platinum or palladium. In certain embodiments, the first PGM component is Pd. In certain embodiments, the first PGM component is Pt. The concentration of the first PGM component (e.g., Pt and/or Pd) can vary, but will typically be from about 1 wt % to about 10 wt % relative to the weight of the OSC alone (e.g., about 1 wt % to about 4 wt % relative to the weight of the OSC alone).

Promoter Metal

The LT-CO oxidation catalyst compositions of the present disclosure comprise a promoter metal. "Promoter metal" as used herein refers to a base metal or an oxide thereof. As used herein, "base metal" refers to a metal selected from copper, lead, iron, nickel, zinc, aluminum, tin, tungsten, molybdenum, tantalum, cobalt, bismuth, cadmium, titanium, zirconium, antimony, manganese, beryllium, chromium, germanium, vanadium, gallium, hafnium, indium, niobium, rhenium, thallium, and combinations thereof. In some embodiments, reference is made to a "first promoter metal" and a "second promoter metal." Accordingly, each of the first and second promoter metals are independently selected from copper, lead, iron, nickel, zinc, aluminum, tin, tungsten, molybdenum, tantalum, cobalt, bismuth, cadmium, titanium, zirconium, antimony, manganese, beryllium, chromium, germanium, vanadium, gallium, hafnium, indium, niobium, rhenium, thallium, or a combination thereof. In some embodiments, the first and second promoter metals are the same. In some embodiments, the first and second promoter metals are different from each other. In some embodiments, the first promoter metal is tin (Sn) or an oxide thereof. In some embodiments, the second promoter metal is tin (Sn) or an oxide thereof. In some embodiments, the first promoter metal, the second promoter metal, or both is manganese (Mn) or an oxide thereof. In some embodiments, the first promoter metal is present in an amount of from about 0.1 to about 10% by weight of the OSC alone, calculated on a metal oxide basis. In some embodiments, the second promoter metal is present in an amount of from about 0.1 to about 10% by weight of the second refractory metal oxide, or the second zeolite, or both, calculated on a metal oxide basis. In some embodiments, the first promoter metal is present in an amount of from about 0.5 to about 4% by weight of the OSC alone, calculated on a metal oxide basis. In some embodiments, the second promoter metal is present in an amount of from about 0.5 to about 4% by weight of the second refractory metal oxide, or the second zeolite, or both, calculated on a metal oxide basis.

In certain embodiments, the OSC is ceria, the first PGM component is Pd, Pt, or a combination thereof, and the first promoter metal is Sn. In certain embodiments, the OSC is ceria, the first PGM component is present at about 2 wt % relative to the weight of the OSC alone, and is Pd or Pt, and the first promoter metal is present at about 1 wt % relative to the weight of the OSC alone, and is Sn or an oxide thereof.

Refractory Metal Oxide

In some embodiments, the LT-CO oxidation catalyst composition may further comprise a first refractory metal oxide. As used herein, "refractory metal oxide" refers to porous metal-containing oxide materials exhibiting chemical and physical stability at high temperatures, such as the temperatures associated with diesel engine exhaust. Exemplary refractory metal oxides include alumina, silica, zirconia, titania, yttria, ceria, praseodymia, and physical mixtures or chemical combinations thereof, including atomically-doped combinations and including high surface area or activated compounds, such as activated alumina. Included are combinations of metal oxides such as silica-alumina, ceria-zirconia, praseodymia-ceria, alumina-zirconia, alumina-ceria-zirconia, lanthana-alumina, lanthana-zirconia-alumina, baria-alumina, baria-lanthana-alumina, baria-lanthana-neodymia-alumina and alumina-ceria. In some embodiments, the first refractory metal oxide is selected from the group consisting of alumina, silica, zirconia, titania, yttria, and combinations thereof. Exemplary aluminas include large pore boehmite, gamma-alumina, and delta/theta alumina. Useful commercial aluminas include activated aluminas, such as high bulk density gamma-alumina, low or medium bulk density large pore gamma-alumina, and low bulk density large pore boehmite and gamma-alumina.

Refractory metal oxides may be referred to as "high surface area" refractory metal oxides. These may include materials such as high surface area alumina, also referred to as "gamma alumina" or "activated alumina," and which typically exhibit a BET surface area in excess of 60 m$^2$/g, often up to about 200 m$^2$/g or higher. An exemplary refractory metal oxide comprises high surface area γ-alumina having a specific surface area of about 50 m$^2$/g to about 300 m$^2$/g. Such activated alumina is usually a mixture of the gamma and delta phases of alumina, but may also contain substantial amounts of eta, kappa and theta alumina phases. "BET surface area" has its usual meaning of referring to the Brunauer, Emmett, Teller method for determining surface area by N$_2$ adsorption. Desirably, the active alumina has a specific surface area of about 60 m$^2$/g to about 350 m$^2$/g, for example, from about 90 m$^2$/g to about 250 m$^2$/g.

The LT-CO oxidation catalyst composition may comprise any of the above named refractory metal oxides and in any amount. The catalyst composition may, for example, comprise from about 30 to about 80 wt % of the first refractory metal oxide.

In some embodiments, reference is made to a second refractory metal oxide. In these embodiments, "refractory metal oxide" has the same meaning as defined with respect to the first refractory metal oxide. In some embodiments, the first and second refractory metal oxides are each independently selected. In some embodiments, the first and second refractory metal oxides are the same. In some embodiments, the LT-CO oxidation catalyst composition as disclosed herein further comprises a first refractory metal oxide selected from the group consisting of alumina, silica, zirconia, titania, yttria, and combinations thereof.

Zeolites

In some embodiments, the LT-CO oxidation catalyst composition may further comprise one or more zeolites. In some embodiments, reference is made to a first zeolite. In some embodiments, the first zeolite comprises one or more zeolites. In some embodiments, the one or more zeolites are small pore zeolites having a 6- to 8-membered ring structure (e.g., the first zeolite may be a single small pore zeolite or several different small pore zeolites). In some embodiments, the one or more small pore zeolites are selected from the group consisting of chabazite (CHA), zeolite A (LTA), and combinations thereof. In some embodiments, the first zeolite comprises one or more medium or large pore zeolites having a 10- to 12-membered ring structure. (e.g., the first zeolite may be a single medium or large pore zeolite or several different medium or large pore zeolites). In some embodiments, the one or more medium or large pore zeolites are selected from the group consisting of ferrierite (FER), ZSM-5 (MFI), beta zeolite (BEA), Y zeolite (FAU), and combinations thereof Alkaline Earth Metal Component In some embodiments, the LT-CO oxidation catalyst composition may further comprise an alkaline earth metal component. As used herein, the term "alkaline earth metal component" refers to an alkaline earth metal compound, complex, or the like which, upon calcination or use of the catalyst, decomposes or otherwise converts to a catalytically active form, usually the metal oxide. As used herein, the term "alkaline earth metal" refers to Group II metals such as magnesium, calcium, strontium, and barium. In some embodiments, the alkaline earth metal component is an oxide of barium, calcium, magnesium, strontium, or a mixture thereof. In some embodiments, the alkaline earth metal component is an oxide of barium. In some embodiments, the alkaline earth metal component is an oxide of magnesium. In some embodiments, the alkaline earth metal component is impregnated in or disposed on the rare earth metal oxide (i.e., the rare earth metal oxide is doped with an alkaline earth metal component).

While the foregoing description provides several suitable ranges or amounts for the OSC, promoter metal, refractory metal oxide, and PGM components of the LT-CO oxidation catalyst composition, it should be noted that each disclosed range or amount for one of these components may be combined with a disclosed range or amount for the other components to form new ranges or sub-ranges. Such embodiments are also expressly contemplated by the invention.

Catalytic Articles

In one or more embodiments, the present LT-CO oxidation catalyst compositions are disposed on a substrate in the form of a washcoat to form a catalytic article. Catalytic articles comprising the coated substrates are part of an exhaust gas treatment system (e.g., catalytic articles including, but not limited to, articles including the LT-CO oxidation catalyst compositions disclosed herein).

Substrates

Useful substrates are 3-dimensional, having a length and a diameter and a volume, similar to a cylinder. The shape does not necessarily have to conform to a cylinder. The length is an axial length defined by an inlet end and an outlet end.

According to one or more embodiments, the substrate for the disclosed composition(s) may be constructed of any material typically used for preparing automotive catalysts and will typically comprise a metal or ceramic honeycomb structure. The substrate typically provides a plurality of wall surfaces upon which the washcoat composition is applied and adhered, thereby acting as a substrate for the catalyst composition.

Ceramic substrates may be made of any suitable refractory material, e.g. cordierite, cordierite-α-alumina, aluminum titanate, silicon titanate, silicon carbide, silicon nitride, zircon mullite, spodumene, alumina-silica-magnesia, zircon silicate, sillimanite, a magnesium silicate, zircon, petalite, α-alumina, an aluminosilicate and the like.

Substrates may also be metallic, comprising one or more metals or metal alloys. A metallic substrate may include any metallic substrate, such as those with openings or "punch-outs" in the channel walls The metallic substrates may be employed in various shapes such as pellets, corrugated sheet or monolithic foam. Specific examples of metallic substrates include heat-resistant, base-metal alloys, especially those in which iron is a substantial or major component. Such alloys may contain one or more of nickel, chromium, and aluminum, and the total of these metals may advantageously comprise at least about 15 wt % (weight percent) of the alloy, for instance, about 10 to about 25 wt % chromium, about 1 to about 8 wt % of aluminum, and from 0 to about 20 wt % of nickel, in each case based on the weight of the substrate. Examples of metallic substrates include those having straight channels; those having protruding blades along the axial channels to disrupt gas flow and to open communication of gas flow between channels; and those having blades and also holes to enhance gas transport between channels allowing for radial gas transport throughout the monolith. Metallic substrates, in particular, are advantageously employed in certain embodiments in a close-coupled position, allowing for fast heat-up of the substrate and, correspondingly, fast heat up of a catalyst composition coated therein (e.g., a LT-CO oxidation catalyst composition).

Any suitable substrate for the catalytic articles disclosed herein may be employed, such as a monolithic substrate of the type having fine, parallel gas flow passages extending there through from an inlet or an outlet face of the substrate such that passages are open to fluid flow there through ("flow-through substrate"). Another suitable substrate is of the type have a plurality of fine, substantially parallel gas flow passages extending along the longitudinal axis of the substrate where, typically, each passage is blocked at one end of the substrate body, with alternate passages blocked at opposite end-faces ("wall-flow filter"). Flow-through and wall-flow substrates are also taught, for example, in International Application Publication No. WO2016/070090, which is incorporated herein by reference in its entirety.

In some embodiments, the catalyst substrate comprises a honeycomb substrate in the form of a wall-flow filter or a flow-through substrate. In some embodiments, the substrate is a wall-flow filter. Flow-through substrates and wall-flow filters will be further discussed herein below.

Flow-Through Substrates

In some embodiments, the substrate is a flow-through substrate (e.g., monolithic substrate, including a flow-through honeycomb monolithic substrate). Flow-through substrates have fine, parallel gas flow passages extending from an inlet end to an outlet end of the substrate such that passages are open to fluid flow. The passages, which are essentially straight paths from their fluid inlet to their fluid outlet, are defined by walls on which a catalytic coating is disposed so that gases flowing through the passages contact the catalytic material. The flow passages of the flow-through substrate are thin-walled channels, which can be of any suitable cross-sectional shape and size such as trapezoidal, rectangular, square, sinusoidal, hexagonal, oval, circular, etc. The flow-through substrate can be ceramic or metallic as described above.

Flow-through substrates can, for example, have a volume of from about 50 in$^3$ to about 1200 in$^3$, a cell density (inlet openings) of from about 60 cells per square inch (cpsi) to about 500 cpsi or up to about 900 cpsi, for example from about 200 to about 400 cpsi and a wall thickness of from about 50 to about 200 microns or about 400 microns.

Figure 1A:
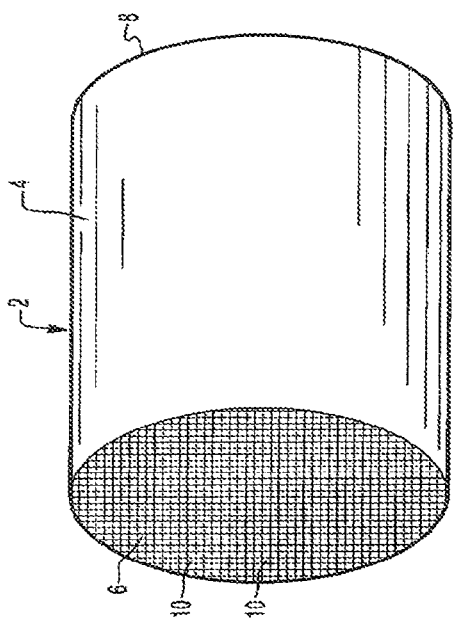
FIG. 1A is a perspective view of a honeycomb-type substrate which may comprise a catalyst (i.e., low-temperature CO oxidation catalyst) washcoat composition in accordance with the present disclosure.

A catalytic article can be provided by applying a catalytic coating (e.g., as disclosed herein) to the substrate as a washcoat. FIGS. 1A and 1B illustrate an exemplary substrate 2 in the form of a flow-through substrate coated with a catalyst composition as described herein. Referring to FIG. 1A, the exemplary substrate 2 has a cylindrical shape and a cylindrical outer surface 4, an upstream end face 6 and a corresponding downstream end face 8, which is identical to end face 6. Substrate 2 has a plurality of fine, parallel gas flow passages 10 formed therein. As seen in FIG. 1B, flow passages 10 are formed by walls 12 and extend through carrier 2 from upstream end face 6 to downstream end face 8, the passages 10 being unobstructed so as to permit the flow of a fluid, e.g., a gas stream, longitudinally through carrier 2 via gas flow passages 10 thereof. As more easily seen in FIG. 1B, walls 12 are so dimensioned and configured that gas flow passages 10 have a substantially regular polygonal shape. As shown, the catalyst composition can be applied in multiple, distinct layers if desired. In the illustrated embodiment, the catalyst composition consists of both a discrete bottom layer 14 adhered to the walls 12 of the carrier member and a second discrete top layer 16 coated over the bottom layer 14. The present invention can be practiced with one or more (e.g., two, three, or four or more) catalyst composition layers and is not limited to the two-layer embodiment illustrated in FIG. 1B. Further coating configurations are disclosed herein below.

Wall-Flow Filter Substrates

In some embodiments, the substrate is a wall-flow filter, which generally has a plurality of fine, substantially parallel gas flow passages extending along the longitudinal axis of the substrate. Typically, each passage is blocked at one end of the substrate body, with alternate passages blocked at opposite end-faces. Such monolithic wall-flow filter substrates may contain up to about 900 or more flow passages (or "cells") per square inch of cross-section, although far fewer may be used. For example, the substrate may have from about 7 to 600, more usually from about 100 to 400, cells per square inch ("cpsi"). The cells can have cross-sections that are rectangular, square, circular, oval, triangular, hexagonal, or are of other polygonal shapes.

Figure 2:
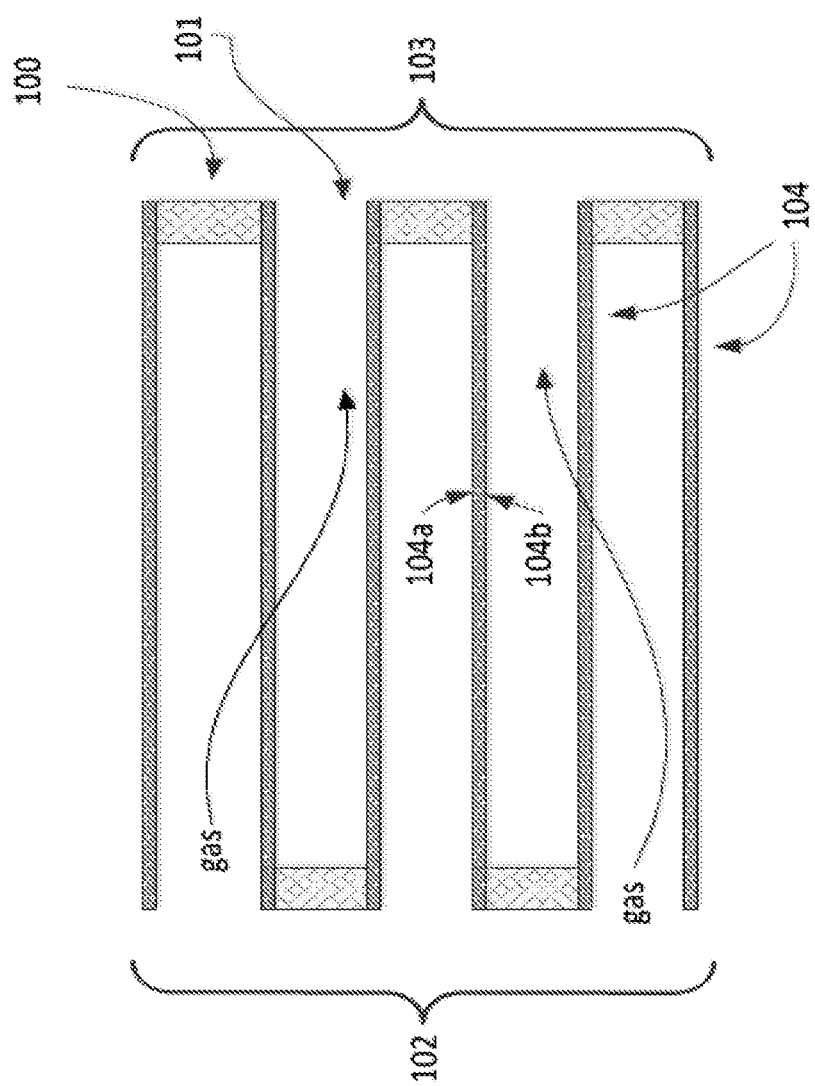
FIG. 2 is a cutaway view of a section enlarged relative to FIG. 1A, wherein the honeycomb-type substrate in FIG. 1A represents a wall-flow filter.

FIG. 2 is a cross-section view of an example monolithic wall-flow filter substrate section, showing alternating plugged and open passages (cells). Blocked or plugged ends 100 alternate with open passages 101, with each opposing end open and blocked, respectively. The filter has an inlet end 102 and outlet end 103. The arrows crossing porous cell walls 104 represent exhaust gas flow entering the open cell ends, diffusion through the porous cell walls 104 and exiting the open outlet cell ends. Plugged ends 100 prevent gas flow and encourage diffusion through the cell walls. Each cell wall will have an inlet side 104a and outlet side 104b. The passages are enclosed by the cell walls.

The wall-flow filter article substrate may have a volume of, for instance, from about 50 cm$^3$, about 100 cm$^3$, about 200 cm$^3$, about 300 cm$^3$, about 400 cm$^3$, about 500 cm$^3$, about 600 cm$^3$, about 700 cm$^3$, about 800 cm$^3$, about 900 cm$^3$ or about 1000 cm$^3$ to about 1500 cm$^3$, about 2000 cm$^3$, about 2500 cm$^3$, about 3000 cm$^3$, about 3500 cm$^3$, about 4000 cm$^3$, about 4500 cm$^3$ or about 5000 cm$^3$. Wall-flow filter substrates typically have a wall thickness from about 50 microns to about 2000 microns, for example from about 50 microns to about 450 microns or from about 150 microns to about 400 microns.

The walls of the wall-flow filter are porous and generally have a wall porosity of at least about 50% or at least about 60% with an average pore size of at least about 5 microns prior to disposition of the functional coating. For instance, the wall-flow filter article substrate in some embodiments will have a porosity of ≥50%, ≥60%, ≥65% or ≥70%. For instance, the wall-flow filter article substrate will have a wall porosity of from about 50%, about 60%, about 65% or about 70% to about 75%, about 80% or about 85% and an average pore size of from about 5 microns, about 10, about 20, about 30, about 40 or about 50 microns to about 60 microns, about 70, about 80, about 90 or about 100 microns prior to disposition of a catalytic coating. The terms "wall porosity" and "substrate porosity" mean the same thing and are interchangeable. Porosity is the ratio of void volume divided by the total volume of a substrate. Pore size may be determined according to ISO15901-2 (static volumetric) procedure for nitrogen pore size analysis. Nitrogen pore size may be determined on Micromeritics TRISTAR 3000 series instruments. Nitrogen pore size may be determined using BJH (Barrett-Joyner-Halenda) calculations and 33 desorption points. Useful wall-flow filters have high porosity, allowing high loadings of catalyst compositions without excessive backpressure during operation.

In some embodiments, the catalytic article of the present disclosure comprises a substrate having an inlet end and an outlet end defining an overall length; and a first washcoat comprising the LT-CO oxidation catalyst composition as disclosed herein disposed on at least a portion thereof. In some embodiments, the catalytic article further comprises a diesel oxidation catalyst (DOC) composition, the DOC composition comprising a second washcoat comprising one or more zeolites, wherein the one or more zeolites are impregnated with a second PGM component; and a third washcoat comprising one or more zeolites and a second refractory metal oxide, wherein one or more than one of the one or more zeolites, or the second refractory metal oxide, or both, are impregnated with a third PGM component.

In another aspect is provided a catalytic article for abatement of exhaust gas emissions from a lean burn engine, the catalyst article comprising a substrate; a first washcoat comprising an oxygen storage component (OSC), a first platinum group metal (PGM) component, a first promoter metal, and optionally a first refractory metal oxide, wherein the OSC is impregnated with the first PGM component and the first promoter metal; a second washcoat comprising a first zeolite, wherein the first zeolite is impregnated with a second PGM component; and a third washcoat comprising a second zeolite and a second refractory metal oxide, wherein second zeolite zeolites, or the second refractory metal oxide, or both, are impregnated with a third PGM component, and optionally a promoter metal; and wherein the catalytic article is effective for oxidizing carbon monoxide and hydrocarbons under cold start conditions.

As referenced above, in some embodiments, the present catalytic article comprises a first, second, and third washcoat, each of which comprises or may comprise one or more zeolites (e.g., a second zeolite and a third zeolite). In each instance, the second and third zeolites are selected from the group of zeolites as disclosed herein above. Within these first, second and third washcoats, each of the second and third zeolites are independently selected for each occasion from the one or more zeolites as described herein. In some embodiments, the one or more zeolites is a single zeolite. In some embodiments, the one or more zeolites comprises a mixture of more than one zeolite, e.g., two zeolites or three zeolites in a mixture. In some embodiments, the first washcoat further comprises a small pore zeolite, a large pore zeolite, or a combination thereof as described herein above. In some embodiments, the second zeolite and the third zeolite each comprises a hydrothermally stable zeolite in the form of a 6- to 12-membered ring structure. In some embodiments, each of the second zeolite and the third zeolite are independently selected from the group consisting of ZSM-5, beta, mordenite, Y zeolite, chabazite, ferrierite, and combinations thereof.

In some embodiments, the second zeolite is impregnated with a second PGM component, which is distinguished from the first PGM components referenced above, but which can similarly comprise, e.g., Pt, Pd, or a mixture thereof. In some embodiments, the third zeolite in the mixture is impregnated with a third PGM component, which is distinguished from the first and second PGM components referenced herein, but which can similarly comprise, e.g., Pt, Pd, or a mixture thereof.

As referenced above, in some embodiments, the present catalytic article comprises a first, second, and third washcoat, each of which comprises or may comprise a refractory metal oxide. Within these washcoats, the second refractory metal oxide is independently selected from those refractory metal oxides described herein with respect to the first refractory metal oxide. The second refractory metal oxide is typically selected from the group consisting of alumina, zirconia, silica, titania, ceria, for example bulk ceria, manganese oxide, zirconia-alumina, ceria-zirconia, ceria-alumina, lanthana-alumina, baria-alumina, silica, silica-alumina, and combinations thereof. Each of the first and second refractory metal oxides may be the same or may be different (i.e., independently selected for each component). In some embodiments, the first and second refractory metal oxides are the same. In some embodiments, the first and second refractory metal oxides are different. In some embodiments, the second refractory metal oxide is impregnated with a second promoter metal. The second promoter metal is as described herein above with respect to the LT-CO oxidation catalyst composition.

Further, within these second and third washcoats, each of the second PGM component and the third PGM component are independently selected from those described herein with respect to the first PGM component. Each of the first, second and third PGM components may be the same or may be different (i.e., independently selected for each component). In some embodiments, the first, second, and third PGM components are the same. In some embodiments, the first, second, and third PGM components are different. In some embodiments, the first and second PGM components are the same. In some embodiments, the first and third PGM components are the same. In some embodiments, the second and third PGM components are the same. In certain embodiments, all of the first, second, and third PGM components comprise Pt, Pd, or a combination thereof. In certain embodiments, the second PGM component comprises Pt, Pd, or a combination thereof. In certain embodiments, the second PGM component comprises Pt and Pd, e.g., including, but not limited to, Pt and Pd present in a weight ratio of from about 1:10 to about 10:1 Pt:Pd. In certain embodiments, the third PGM component comprises Pt, Pd, or a combination thereof.

In some embodiments, the first washcoat further comprises a small pore zeolite, a large pore zeolite, an alkaline earth metal component, or a combination thereof. Each of the small pore zeolite, the large pore zeolite, and the alkaline earth metal component are as described herein above.

As described herein above, the washcoat configurations may vary. All modes of disposing the washcoats on the substrate are contemplated herein, including various manners of layering, zoning, and combinations thereof.

In some embodiments, the LT-CO oxidation catalytic article of the present disclosure is effective for oxidizing carbon monoxide and hydrocarbons under cold start conditions. In some embodiments, the cold start condition comprises an exhaust gas temperature that is below about 150° C.

In some embodiments, the LT-CO oxidation catalytic article of the present disclosure further comprises a HC trap composition. In some embodiments, the LT-CO oxidation catalytic article further comprises a low temperature $NO_x$ adsorber (LT-NA) composition. In some embodiments, the LT-CO oxidation catalytic article further comprises a lean $NO_x$ trap (LNT) composition.

Preparation of Catalytic Compositions

The disclosed LT-CO oxidation catalyst compositions may, in some embodiments, be prepared via an incipient wetness impregnation method. Incipient wetness impregnation techniques, also called capillary impregnation or dry impregnation are commonly used for the synthesis of heterogeneous materials, i.e., catalysts. Typically, a metal precursor is dissolved in an aqueous or organic solution and then the metal-containing solution is added to a catalyst support (e.g., a refractory metal oxide) containing the same pore volume as the volume of the solution that was added. Capillary action draws the solution into the pores of the support. Solution added in excess of the support pore volume causes the solution transport to change from a capillary action process to a diffusion process, which is much slower. The catalyst can then be dried and calcined to remove the volatile components within the solution, depositing the metal on the surface of the catalyst support. The maximum loading is limited by the solubility of the precursor in the solution. The concentration profile of the impregnated material depends on the mass transfer conditions within the pores during impregnation and drying. One of skill in the art will recognize other methods for loading the PGM and promoter metal components into the supports of the present compositions, for example, adsorption, ion-exchange, precipitation, and the like.

For example, PGMs may be impregnated on a zeolite or refractory metal oxide in the preparation of components of the LT-CO oxidation catalyst composition or article as disclosed herein. Generally, aqueous solutions of soluble compounds or complexes of the platinum group metals are used to impregnate the support material (e.g., zeolite or refractory metal oxide). Non-limiting examples of suitable compounds include palladium nitrate, tetraammine palladium nitrate, tetraammine platinum acetate, and platinum nitrate. Further, at least a portion of a catalytically active metal may be included during a zeolite synthetic process such that a tailored colloid contains a structure directing agent, a silica source, an alumina source and a metal ion source. In some embodiments, palladium and/or platinum and other metal salts may be mixed together and the mixture impregnated on a zeolite. The metals used in the salts may include, but are not limited to, metals selected from the group consisting of copper, iron, manganese, magnesium, cobalt, nickel, platinum, ruthenium, rhodium, and combinations thereof.

During the calcination steps, or at least during the initial phase of use of the composite, such compounds are converted into a catalytically active form of the metal or a compound thereof. A suitable method of preparing an oxidation catalyst composition is to prepare a mixture of a solution of a desired platinum group metal compound (e.g., platinum compound and/or a palladium compound) and at least one support, such as a finely divided, high surface area, refractory metal oxide support, e.g., gamma alumina, which is sufficiently dry to absorb substantially all of the solution to form a wet solid which is later combined with water to form a coatable slurry. In one or more embodiments, the slurry is acidic, having, for example, a pH of about 2 to less than about 7. The pH of the slurry may be lowered by the addition of an adequate amount of an inorganic acid or an organic acid to the slurry. Combinations of both can be used when compatibility of acid and raw materials is considered. Inorganic acids include, but are not limited to, nitric acid. Organic acids include, but are not limited to, acetic, propionic, oxalic, malonic, succinic, glutamic, adipic, maleic, fumaric, phthalic, tartaric, citric acid and the like.

Coating Compositions

To produce catalytic articles, a substrate as disclosed herein is coated with a catalytic composition. The coatings are "catalytic coating compositions" or "catalytic coatings." The terms "catalyst composition" and "catalytic coating composition" are synonymous. A catalyst composition as described herein may comprise one or more supports or "carriers" such as refractory inorganic solid oxide porous powders further comprising functionally active species.

Catalyst compositions may be prepared using a binder, for example, a $ZrO_2$ binder derived from a suitable precursor such as zirconyl acetate or any other suitable zirconium precursor such as zirconyl nitrate. Zirconyl acetate binder provides a coating that remains homogeneous and intact after thermal aging, for example, when the catalyst is exposed to high temperatures of at least about 600° C., for example, about 800° C. and higher water vapor environments of about 5% or more. Other potentially suitable binders include, but are not limited to, alumina and silica. Alumina binders include aluminum oxides, aluminum hydroxides and aluminum oxyhydroxides. Aluminum salts and colloidal forms of alumina many also be used. Silica binders include various forms of $SiO_2$, including silicates and colloidal silica. Binder compositions may include any combination of zirconia, alumina and silica. Other exemplary binders include boehemite, gamma-alumina, or delta/theta alumina, as well as silica sol. When present, the binder is typically used in an amount of about 1-5 wt % of the total washcoat loading. Alternatively the binder can be zirconia-based or silica-based, for example zirconium acetate, zirconia sol or silica sol. When present, the alumina binder is typically used in an amount of about 0.05 $g/in^3$ to about 1 $g/in^3$.

Coatings

A substrate is coated with a catalyst composition to form a catalytic article. The catalytic coating may comprise one or more thin, adherent coating layers disposed on and in adherence to least a portion of a substrate. In some embodiment, the present catalytic articles may include the use of one or more catalyst layers and combinations of one or more catalyst layers. Catalytic materials may be present on the inlet side of the substrate wall alone, the outlet side alone, both the inlet and outlet sides, or the wall itself may consist all, or in part, of the catalytic material. The catalytic coating may be on the substrate wall surfaces and/or in the pores of the substrate walls, that is "in" and/or "on" the substrate walls. Thus, the phrase "a catalytic coating disposed on the substrate" means on any surface, for example on a wall surface and/or on a pore surface. The catalytic coating layer(s) may comprise the individual functional components, that is, an LT-CO oxidation catalyst composition and a DOC catalyst composition, each as described herein.

In some embodiments, the catalytic coating layer(s) may comprise an LT-CO oxidation catalyst composition as described herein and a low temperature $NO_x$ adsorber (LT-NA) composition. Any suitable LT-NA composition known in the art may be used, such as an LT-NA composition comprising a platinum group metal (PGM) and a molecular sieve. Suitable LT-NA compositions are disclosed in, for example, International Patent Application Publication No. WO2018/073750 to Li, the disclosure of which is incorporated herein in its entirety with respect to teachings of suitable LT-NA compositions.

In some embodiments, the catalytic coating layer(s) may comprise an LT-CO oxidation catalyst composition as described herein and a lean $NO_x$ trap (LNT) composition. Any suitable LNT composition known in the art may be used, such as an LNT composition comprising an alkaline earth component and a platinum group component. Suitable LNT compositions are disclosed in, for example, International Patent Application Publication No. WO2018/073750 to Li, the disclosure of which is incorporated herein in its entirety with respect to teachings of suitable LNT compositions.

A catalyst composition may typically be applied in the form of a washcoat, containing support material having catalytically active species thereon (e.g., as provided herein above). A washcoat is formed by preparing a slurry containing a specified solids content (e.g., about 10 to about 60% by weight) of a catalyst composition in a liquid vehicle, which is then applied to a substrate and dried and calcined to provide a coating layer. If multiple coating layers are applied, the substrate is dried and calcined after each layer is applied and/or after the number of desired multiple layers are applied. In one or more embodiments, the catalytic material(s) are applied to the substrate as a washcoat. Binders may also be employed as described above.

The above-noted catalyst composition(s) are generally independently mixed with water to form a slurry for purposes of coating a catalyst substrate, such as a honeycomb-type substrate. In addition to the catalyst particles, the slurry may optionally contain a binder (e.g., alumina, silica), water-soluble or water-dispersible stabilizers, promoters, associative thickeners, and/or surfactants (including anionic, cationic, non-ionic or amphoteric surfactants). A typical pH range for the slurry is about 3 to about 6. Addition of acidic or basic species to the slurry can be carried out to adjust the pH accordingly. For example, in some embodiments, the pH of the slurry is adjusted by the addition of ammonium hydroxide or aqueous nitric acid.

The slurry can be milled to enhance mixing of the particles and formation of a homogenous material. The milling can be accomplished in a ball mill, continuous mill, or other similar equipment, and the solids content of the slurry may be, e.g., about 20-60 wt %, more particularly about 20-40 wt %. In one embodiment, the post-milling slurry is characterized by a $D_{90}$ particle size of about 10 to about 40 microns, preferably 10 to about 30 microns, more preferably about 10 to about 15 microns.

The slurry is then coated on the catalyst substrate using any washcoat technique known in the art. In one embodiment, the catalyst substrate is dipped one or more times in the slurry or otherwise coated with the slurry. Thereafter, the coated substrate is dried at an elevated temperature (e.g., 100-150° C.) for a period of time (e.g., 10 min-3 hours) and then calcined by heating, e.g., at 400-600° C., typically for about 10 minutes to about 3 hours. Following drying and calcining, the final washcoat coating layer can be viewed as essentially solvent-free.

After calcining, the catalyst loading obtained by the above described washcoat technique can be determined through calculation of the difference in coated and uncoated weights of the substrate. As will be apparent to those of skill in the art, the catalyst loading can be modified by altering the slurry rheology. In addition, the coating/drying/calcining process to generate a washcoat can be repeated as needed to build the coating to the desired loading level or thickness, meaning more than one washcoat may be applied.

The washcoat(s) can be applied such that different coating layers may be in direct contact with the substrate. Alternatively, one or more "undercoats" may be present, so that at least a portion of a catalytic or sorbent coating layer or coating layers are not in direct contact with the substrate (but rather, are in contact with the undercoat). One or more "overcoats" may also be present, so that at least a portion of the coating layer or layers are not directly exposed to a gaseous stream or atmosphere (but rather, are in contact with the overcoat).

Different coating layers may be in direct contact with each other without a "middle" overlapping zone. Alternatively, different coating layers may not be in direct contact, with a "gap" between the two zones. In the case of an "undercoat" or "overcoat" the gap between the different layers is termed an "interlayer." An undercoat is a layer "under" a coating layer, an overcoat is a layer "over" a coating layer and an interlayer is a layer "between" two coating layers. The interlayer(s), undercoat(s) and overcoat(s) may contain one or more functional compositions or may be free of functional compositions.

The catalytic coating may comprise more than one thin adherent layer, the layers in adherence to each other and the coating in adherence to the substrate. The entire coating comprises the individual "coating layers". The catalytic coating may advantageously be "zoned", comprising zoned catalytic layers. This may also be described as "laterally zoned". For example, a layer may extend from the inlet end towards the outlet end extending about 10%, about 20%, about 30%, about 40%, about 50%, about 60%, about 70%, about 80%, or about 90% of the substrate length. Another layer may extend from the outlet end towards the inlet end extending about 10%, about 20%, about 30%, about 40%, about 50%, about 60%, about 70%, about 80%, or about 90% of the substrate length. Different coating layers may be adjacent to each other and not overlay each other. Alternatively, different layers may overlay a portion of each other, providing a third "middle" zone. The middle zone may, for example, extend from about 5% to about 80% of the substrate length, for example about 5%, about 10%, about 20%, about 30%, about 40%, about 50%, about 60% or about 70% of the substrate length.

Different layers may each extend the entire length of the substrate or may each extend a portion of the length of the substrate and may overlay or underlay each other, either partially or entirely. Each of the different layers may extend from either the inlet or outlet end.

Different catalytic compositions may reside in each separate coating layer. For example, one coating layer could comprise an oxidation catalyst composition without any optional sorbent compositions and a second layer could include (or consist entirely of) one or more optional sorbent compositions. Thus, discussion related to different layers may correspond to any of these layers. The catalytic coating may comprise one, two or three or more coating layers. The one or more coating layers together comprise the catalytic compositions.

Zones, where present on the catalytic article in certain embodiments of the present disclosure, are defined by the relationship of coating layers. With respect to different coating layers, there are a number of possible zoning configurations. For example, there may be an upstream zone and a downstream zone, there may be an upstream zone, a middle zone and a downstream zone, there may four different zones, etc. Where two layers are adjacent and do not overlap, there are upstream and downstream zones. Where two layers overlap to a certain degree, there are upstream, downstream and middle zones. Where for example, a coating layer extends the entire length of the substrate and a different coating layer extends from the outlet end a certain length and overlays a portion of the first coating layer, there are upstream and downstream zones. The present catalytic coatings may comprise more than one identical layer.

Figure 3A:
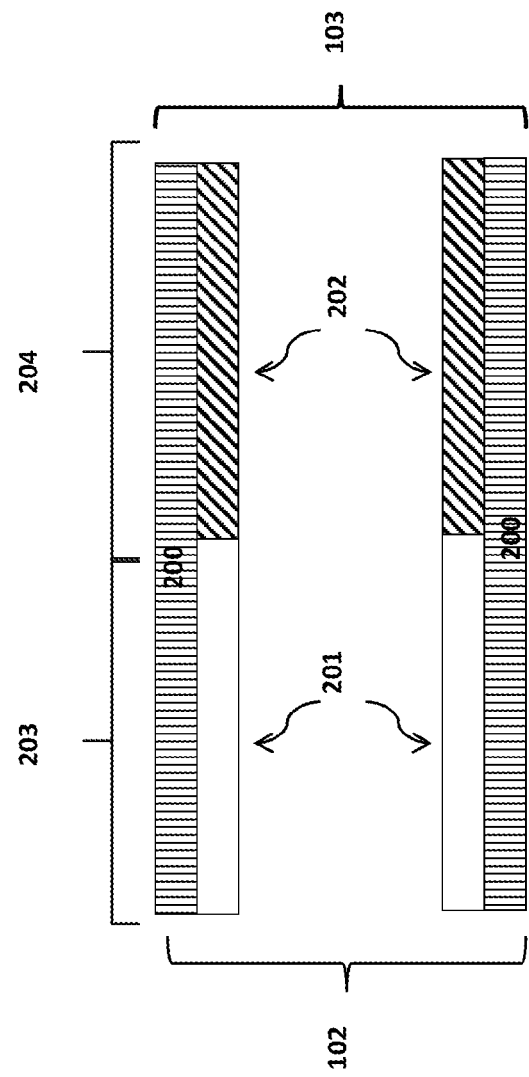
FIG. 3A is a cross-sectional view of an embodiment of a zoned catalytic article of the present disclosure.
Figure 3B:
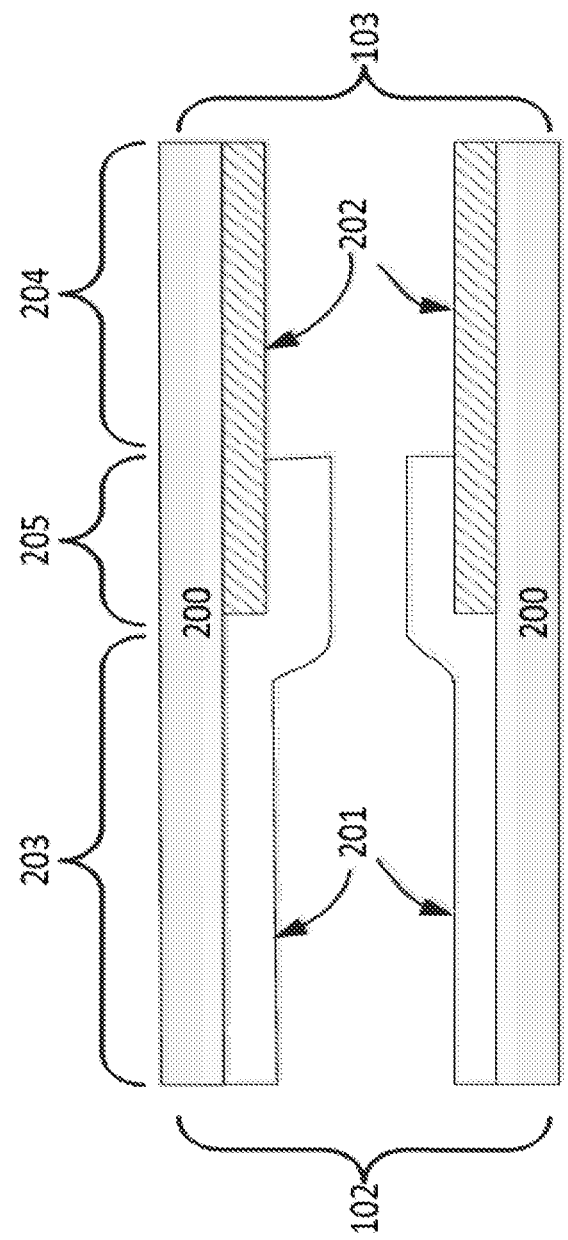
FIG. 3B is a cross-sectional view of an embodiment of a layered catalytic article of the present disclosure.
Figure 3C:
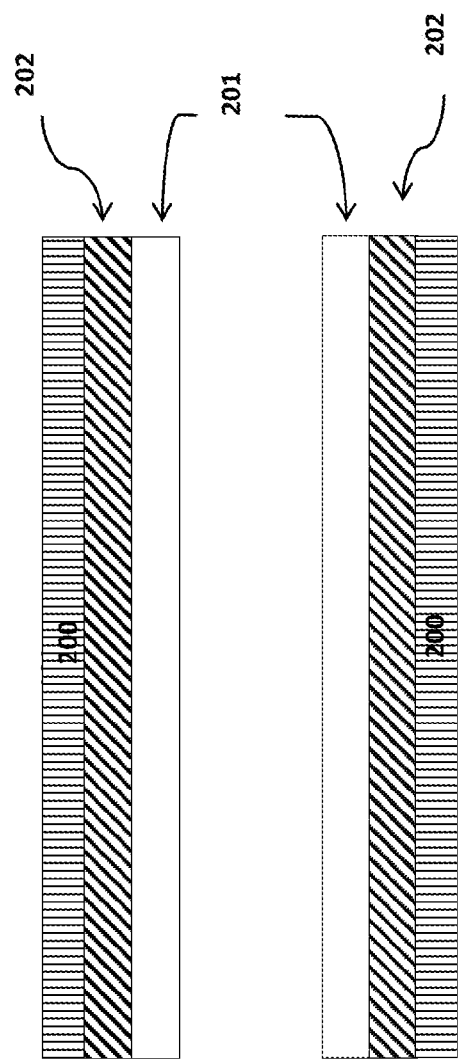
FIG. 3C is a cross-sectional view of another embodiment of a layered catalytic article of the present disclosure.

FIGS. 3A, 3B and 3C show some possible coating layer configurations with two coating layers. Shown are monolithic wall-flow filter substrate walls 200 onto which coating layers 201 and 202 are disposed. This is a simplified illustration, and in the case of a porous wall-flow substrate, not shown are pores and coatings in adherence to pore walls and not shown are plugged ends. In FIG. 3A, coating layer 201 extends from the inlet to the outlet about 50% of the substrate length; and coating layer 202 extends from the outlet to the inlet about 50% of the substrate length and the coating layers are adjacent each other, providing an inlet upstream zone 203 and an outlet downstream zone 204. In FIG. 3B, coating layer 202 extends from the outlet about 50% of the substrate length and layer 201 extends from the inlet greater than 50% of the length and overlays a portion of layer 202, providing an upstream zone 203, a middle zone 205 and a downstream zone 204. In FIG. 3C, coating layers 201 and 202 each extend the entire length of the substrate with layer 201 overlaying layer 202. The substrate of FIG. 3C does not contain a zoned coating configuration. FIGS. 3A, 3B and 3C may be useful to illustrate coating compositions on the wall-through substrate. FIGS. 3A, 3B and 3C may further be useful to illustrate coating compositions on the flow-through substrate, as described herein below. Configurations of such coating layers are not limited.

FIGS. 4A-4G show embodiments of an LT-CO oxidation catalytic article 20, where the LT-CO oxidation catalyst composition is coated according to one or more embodiments of the disclosure. The first washcoat comprises the LT-CO oxidation catalyst composition of the present disclosure. In some embodiments, the article further comprises a diesel oxidation catalyst (DOC) composition, the DOC composition comprising a second washcoat comprising a second refractory metal oxide, wherein the second refractory metal oxide is impregnated with a second PGM component; and a third washcoat comprising one or more zeolites and a third refractory metal oxide, wherein one or more of the one or more zeolites are impregnated with a third PGM component. In some embodiments, the article further comprises a LT-NA composition, the LT-NA composition comprising a second washcoat. In some embodiments, the article further comprises a LNT composition, the LNT composition comprising a second washcoat.

Figure 4A:
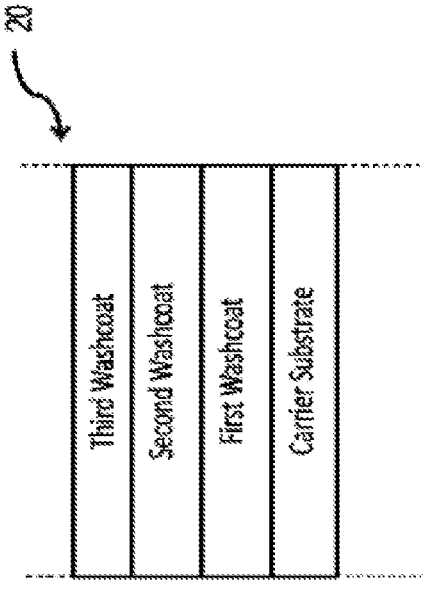
Figure 4B:
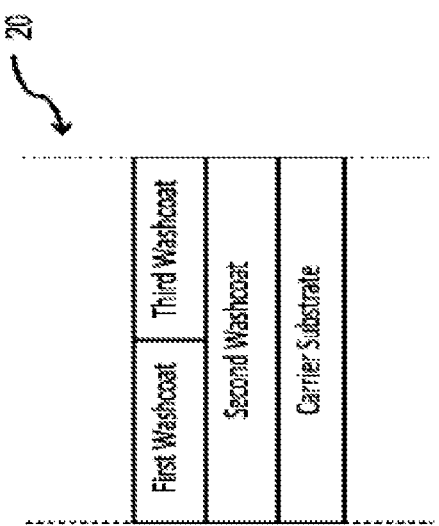

Referring to FIG. 4A, which illustrates one, non-limiting embodiment, the third washcoat is coated on the substrate, the second washcoat is then coated on top (or over) the third washcoat, and the first washcoat is then coated on top (or over) the second washcoat. Referring to FIG. 4B, in other embodiments, the first washcoat is coated on the substrate, the second washcoat is then coated on top (or over) the second washcoat, and the third washcoat is then coated on top (or over) the second washcoat. In some embodiments, the first washcoat is coated on the substrate, the third washcoat is coated on top of the first washcoat, and the second washcoat is coated on top of the third washcoat.

Figure 4C:
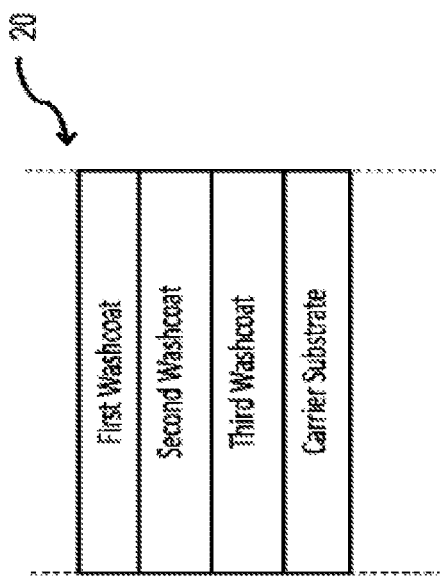
Figure 4D:
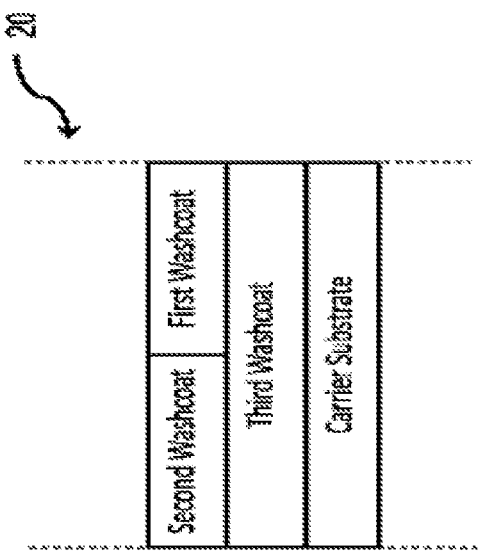

In still further embodiments, the washcoats are coated on a substrate, such that one washcoat is upstream and the other washcoat is downstream. Referring to FIG. 4C, for example, the third washcoat is coated on the substrate, and then the second and first washcoats are coated over (on top) of the third washcoat. Referring to FIG. 4D, the second washcoat is coated on the substrate and then the first and third washcoats are coated over (on top) of the second wash-coat. Referring to FIG. 4E, in further embodiments, the first and third washcoats are coated on the substrate, and the second washcoat is then coated over (on top) of the first and third washcoats. Referring to FIG. 4F, in still further embodiments, the first and second washcoats are coated on the substrate, and the third washcoat is then coated over (on top) of the first and second washcoats. Referring to FIG. 4G, the second and third washcoats are coated on the substrate, the first wash-coat is then coated on top (or over) the second and third washcoats. It will be appreciated by one skilled in the art, that any arrangement of the three washcoat layers/components, either in a layered or zoned structure, is possible.

Loading of the present catalytic coatings on a substrate will depend on substrate properties such as porosity and wall thickness. Typically, wall-flow filter catalyst loading will be lower than catalyst loadings on a flow-through substrate. Catalyzed wall-flow filters are disclosed, for instance, in U.S. Pat. No. 7,229,597, which is incorporated herein by reference in its entirety. The present oxidation catalyst composition and/or DOC catalyst composition are generally present on the substrate at a concentration of, for instance, from about 0.3 to 5.5 $g/in^3$, or from about 0.4 $g/in^3$, about 0.5 $g/in^3$, about 0.6 $g/in^3$, about 0.7 $g/in^3$, about 0.8 $g/in^3$, about 0.9 $g/in^3$ or about 1.0 $g/in^3$ to about 1.5 $g/in^3$, about 2.0 $g/in^3$, about 2.5 $g/in^3$, about 3.0 $g/in^3$, about 3.5 $g/in^3$, about 4.0 $g/in^3$, about 4.5 $g/in^3$, about 5.0 $g/in^3$ or about 5.5 $g/in^3$, based on the substrate. In some embodiments, the first washcoat is present on the substrate with a loading of at least about 0.5 $g/in^3$. Concentration of a catalyst composition, or any other component, on a substrate refers to concentration per any one three-dimensional section or zone, for instance any cross-section of a substrate or of the entire substrate.

Exhaust Gas Treatment Systems

In another aspect is provided an exhaust gas treatment system for treatment of a lean burn engine exhaust gas stream comprising hydrocarbons, carbon monoxide, nitrogen oxides, and particulate matter, the system comprising a lean burn engine producing an exhaust gas stream; an exhaust conduit in fluid communication with the lean burn engine via an exhaust manifold; and catalytic article of the present disclosure, positioned downstream from the lean burn engine and in fluid communication with the exhaust gas stream.

The engine can be, e.g., a diesel engine which operates at combustion conditions with air in excess of that required for stoichiometric combustion, i.e. lean conditions. In other embodiments, the engine can be an engine associated with a stationary source (e.g., electricity generators or pumping stations). In some embodiments, the emission treatment system further comprises one or more additional catalytic components. The relative placement of the various catalytic components present within the emission treatment system can vary.

In the present exhaust gas treatment systems and methods, the exhaust gas stream is received into the article(s) or treatment system by entering the upstream end and exiting the downstream end. The inlet end of a substrate or article is synonymous with the "upstream" end or "front" end. The outlet end is synonymous with the "downstream" end or "rear" end. The treatment system is, in general, downstream of and in fluid communication with an internal combustion engine.

The systems disclosed herein comprise a catalytic article as disclosed herein, and may further comprise one or more additional components. In some embodiments, the one or more additional components are selected from the group consisting of a diesel oxidation catalyst (DOC), a soot filter (which can be catalyzed or uncatalyzed), a selective catalytic reduction (SCR) catalyst, a urea injection component, an ammonia oxidation catalyst (AMOx), a low-temperature $NO_x$ absorber (LT-NA), a lean $NO_x$ trap (LNT), and combinations thereof.

The catalytic article may be located, for example, downstream of a DOC catalytic article. In some embodiments, the catalytic article comprises a DOC catalyst composition (as described above), such that a single substrate carries both the LT-CO oxidation catalyst composition and the DOC composition, thereby combining the functions into a single article (LT-CO/DOC) as disclosed herein. In some embodiments, the catalytic article further comprises a LT-NA or LNT composition (as described herein above), such that a single substrate carries both the LT-CO oxidation catalyst composition and the LT-NA or LNT composition, thereby combining the functions into a single article (LT-CO/LT-NA or LT-CO/LNT) as disclosed herein.

The exhaust gas treatment system of the present disclosure may further comprise an SCR catalyst component. In some embodiments, the LT-CO oxidation catalytic article is located upstream of an SCR catalyst component and/or soot filter. The SCR catalyst component may be located upstream or downstream of the oxidation catalytic article and/or soot filter. A suitable SCR catalyst component for use in the emission treatment system is able to effectively catalyze the reduction of the $NO_x$ exhaust component at temperatures as high as 650° C. In addition, the SCR catalyst component must be active for reduction of $NO_x$ even under conditions of low load which typically are associated with lower exhaust temperatures. Preferably, the SCR catalyst component is capable of converting at least 50% of the $NO_x$ (e.g., NO) component to $N_2$, depending on the amount of reductant added to the system. Another desirable attribute for the SCR catalyst component is that it possesses the ability to catalyze the reaction of $O_2$ with any excess $NH_3$ to form $N_2$, so that $NH_3$ is not emitted to the atmosphere. Useful SCR catalyst components used in the emission treatment system should also have thermal resistance to temperatures greater than 650° C. Such high temperatures may be encountered during regeneration of the catalyzed soot filter. Suitable SCR catalyst components are described, for instance, in U.S. Pat. Nos. 4,961,917 and 5,516,497, each of which is incorporated herein by reference in its entirety.

Figure 5C:
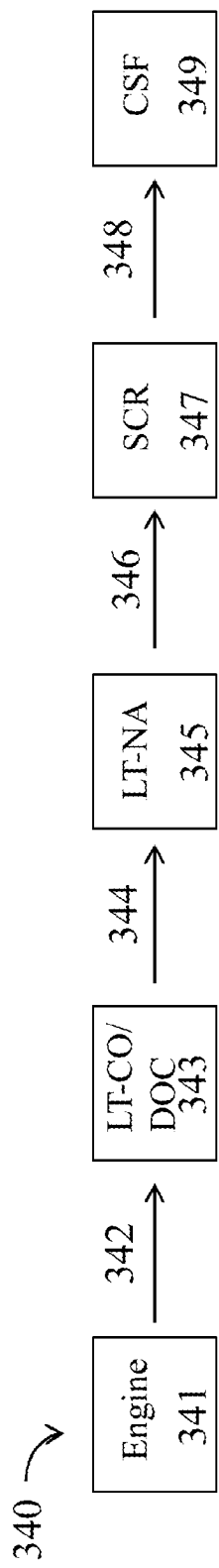
FIG. 5C is a schematic depiction of an embodiment of an exhaust gas treatment system comprising a LT-CO oxidation catalytic article of the present disclosure, wherein the catalytic article is combined with a DOC article, and the LT-CO/DOC is located upstream of a LT-NA, a SCR catalyst component, and a CSF.

Certain exemplified exhaust gas treatment systems may be more readily appreciated by reference to FIGS. 5A-5D, which depict schematic representations of non-limiting exhaust gas treatment systems in accordance with embodiments of the present disclosure. One of skill in the art will recognize that it may be desirable to arrange the relative position of each article in a different order than illustrated herein; such alternative ordering is contemplated by the present disclosure. Referring to FIG. 5A, exhaust gas treatment system 320 is provided, in which an exhaust gas stream containing gaseous pollutants (e.g., unburned hydrocarbons, carbon monoxide and NO) and particulate matter is conveyed via line 322 from an engine 321 to a low temperature CO oxidation/diesel oxidation (LT-CO/DOC) catalytic article 323. In the LT-CO/DOC 323, unburned gaseous and non-volatile hydrocarbons and carbon monoxide are largely combusted to form carbon dioxide and water. The exhaust stream is next conveyed via line 324 to a LT-NA catalytic article 325 for the adsorption and/or storage of NO. The treated exhaust gas stream 326 is next conveyed to a CSF 327, which traps particulate matter present within the exhaust gas stream. After removal of particulate matter, via CSF 327, the exhaust gas stream is conveyed via line 328 to a downstream SCR catalyst component 329, which provides treatment and/or conversion of NO. The exhaust gas passes through the SCR catalyst component 329 at a flow rate which allows sufficient time for the catalyst composition to reduce the level of $NO_x$ (in combination with a reductant) in the exhaust gas at a given temperature in the exhaust gas before exiting the system.

Another embodiment of an exhaust gas treatment system of the disclosure is shown in FIG. 5B, which depicts a schematic representation of an exhaust gas treatment system 330 in accordance with the present disclosure. Referring to FIG. 5B, an exhaust gas stream is conveyed via line 332 from an engine 331 to a low temperature $NO_x$ absorber (LT-NA) catalytic article 333. Next, the exhaust stream is conveyed via line 334 to a LT-CO/DOC 335 and further conveyed via line 336 to CSF 337. Treated exhaust gas stream 338 is conveyed to SCR catalyst component 339 before being expelled into the atmosphere.

Another embodiment of an exhaust gas treatment system of the disclosure is shown in FIG. 5C, which depicts a schematic representation of an exhaust gas treatment system 340. Referring to FIG. 5C, an exhaust gas stream is conveyed via line 342 from an engine 341 to a LT-CO/DOC 343 and further via exhaust gas stream 344 to a LT-NA 345. Next, the exhaust stream is conveyed via line 346 to a SCR catalyst component 347 and further conveyed via line 348 to CSF 349. Treated exhaust gas stream 338 is conveyed to SCR catalyst component 339 before exiting the system.

Figure 5D:
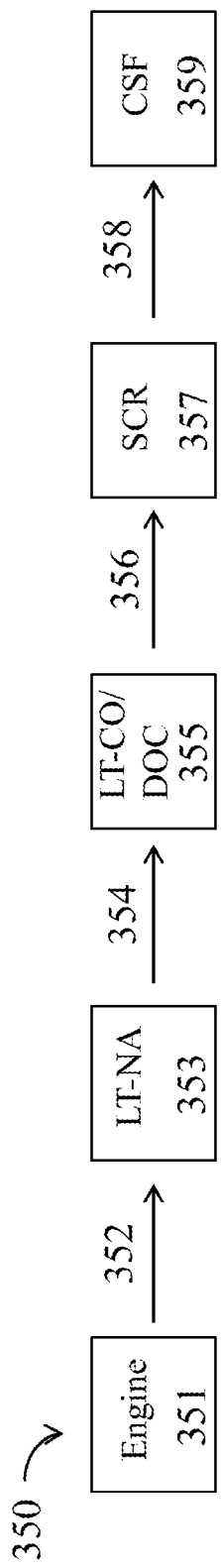
FIG. 5D is a schematic depiction of an embodiment of an exhaust gas treatment system comprising a catalytic article of the present disclosure, wherein the catalytic article is combined with a DOC article, and the LT-CO/DOC is located downstream of an LT-NA and upstream of an SCR catalyst component and a CSF.

Another embodiment of an exhaust gas treatment system of the disclosure is shown in FIG. 5D, which depicts a schematic representation of an exhaust gas treatment system 350 in accordance with the present disclosure. Referring to FIG. 5D, an exhaust gas stream is conveyed via line 352 from an engine 351 to a LT-NA catalytic article 353 and further via gas exhaust line 354 to a LT-CO/DOC 355. Exhaust gas line 356 is conveyed to SCR catalyst component 357, and then the exhaust stream 358 is conveyed to CSF 359 before exiting the system.

Figure 5E:
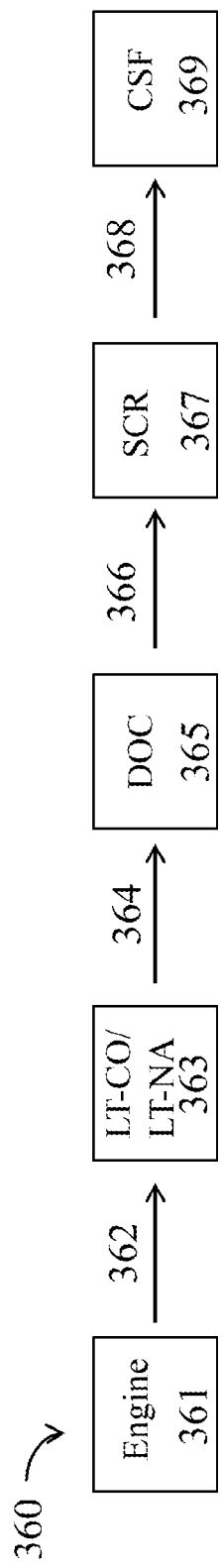
FIG. 5E is a schematic depiction of an embodiment of an exhaust gas treatment system comprising a catalytic article of the present disclosure, wherein the catalytic article includes, in addition to an LT-CO composition, a LT-NA composition, and the LT-CO/LT-NA is located upstream of a DOC, an SCR catalyst component, and a CSF catalyst component.

Another embodiment of an exhaust gas treatment system of the disclosure is shown in FIG. 5E, which depicts a schematic representation of an exhaust gas treatment system 360 in accordance with the present disclosure. Referring to FIG. 5E, an exhaust gas stream is conveyed via line 362 from an engine 361 to a LT-CO/LT-NA catalytic article 363 and further via gas exhaust line 364 to a DOC article 365. Exhaust gas line 366 is conveyed to SCR catalyst article 367, and then the exhaust stream 368 is conveyed to CSF 369 before exiting the system.

Figure 5F:
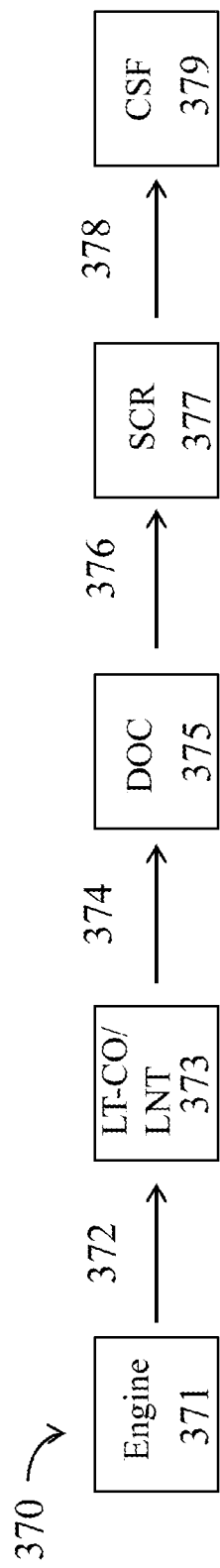
FIG. 5F is a schematic depiction of an embodiment of an exhaust gas treatment system comprising a catalytic article of the present disclosure, wherein the catalytic article is combined with a LNT article, and the LT-CO/LNT is located upstream of a DOC article, an SCR catalyst component and a CSF.

Another embodiment of an exhaust gas treatment system of the disclosure is shown in FIG. 5F, which depicts a schematic representation of an exhaust gas treatment system 370 in accordance with the present disclosure. Referring to FIG. 5F, an exhaust gas stream is conveyed via line 372 from an engine 371 to a LT-CO/LNT catalytic article 373 and further via gas exhaust line 374 to a DOC article 375. Exhaust gas line 376 is conveyed to SCR catalyst article 377, and then the exhaust stream 378 is conveyed to CSF 379 before exiting the system.

Any exemplified exhaust gas treatment system depicted by FIGS. 5A-5F may be followed by a selective ammonia oxidation catalyst (AMOx) to remove $NH_3$ released from the SCR catalyst component and selectively oxidize it to $N_2$.

Method of Treating an Exhaust Gas Stream

In general, hydrocarbons (HCs) and carbon monoxide (CO) present in the exhaust gas stream of any engine can be converted to carbon dioxide and water. Typically, hydrocarbons present in engine exhaust gas stream comprise $C_1$-$C_6$ hydrocarbons (i.e., lower hydrocarbons), such as methane, although higher hydrocarbons (greater than $C_6$) can also be detected.

Aspects of the current disclosure are directed towards a method for treating a lean burn engine exhaust gas stream, the method comprising contacting the exhaust gas stream with the catalytic article of the present disclosure, or the emission treatment system of the present disclosure.

In some embodiments, the method comprises contacting the gas stream with the catalytic article or the exhaust gas treatment system of the present disclosure, for a time and at a temperature sufficient to reduce the levels of CO and HC in the gas stream. In some embodiments, the level of hydrocarbons, e.g., methane, present in the exhaust gas stream is reduced by at least about 30%, or at least about 50%, or at least about 70%, or at least about 75%, or at least about 80%, or at least about 90%, or at least about 95% compared to the level of hydrocarbons present in the exhaust gas stream prior to contact with the catalyst composition. In some embodiments, the temperature required for converting hydrocarbons, e.g., methane, using the catalyst composition described in the present embodiments ranges from about 300° C. to about 650° C., from about 400° C. to about 600° C., or from about 450° C. to about 550° C.

In some embodiments, the catalyst composition comprising the catalytic article is fresh. In other embodiments, the catalyst composition has been degreened (i.e., "aged").

In some embodiments, the reduction of HC and/or CO level is measured in terms of the conversion efficiency. In some embodiments, conversion efficiency is measured as a function of light-off temperature (i.e., $T_{50}$). The light-off temperature is the temperature at which the catalyst composition is able to convert 50% of hydrocarbons or carbon monoxide to carbon dioxide and water. Typically, the lower the measured light-off temperature for any given catalyst composition, the more efficient the catalyst composition is to carry out the catalytic reaction, e.g., hydrocarbon conversion.

The present articles, systems and methods are suitable for treatment of exhaust gas streams from mobile emissions sources such as trucks and automobiles. The present articles, systems and methods are also suitable for treatment of exhaust streams from stationary sources such as power plants.

It will be readily apparent to one of ordinary skill in the relevant arts that suitable modifications and adaptations to the compositions, methods, and applications described herein can be made without departing from the scope of any embodiments or aspects thereof. The compositions and methods provided are exemplary and are not intended to limit the scope of the claimed embodiments. All of the various embodiments, aspects, and options disclosed herein can be combined in all variations. The scope of the compositions, formulations, methods, and processes described herein include all actual or potential combinations of embodiments, aspects, options, examples, and preferences herein. All patents and publications cited herein are incorporated by reference herein for the specific teachings thereof as noted, unless other specific statements of incorporation are specifically provided.

EXAMPLES

The present invention is more fully illustrated by the following examples, which are set forth to illustrate the present invention and is not to be construed as limiting thereof. Unless otherwise noted, all parts and percentages are by weight, and all weight percentages are expressed on a dry basis, meaning excluding water content, unless otherwise indicated.

Catalytic Article Preparation

Example 1: Reference Article (2% Pd on Ceria)

Catalyst Powder Preparation

Palladium nitrate (29 grams) was diluted with 75 grams of de-ionized water. The solution was added onto 300 grams of ceria. The mixture was homogenized and the resulting powder was dried for 4 hours at 120° C. and calcined for one hour at 500° C.

Catalyst Washcoat Slurry Preparation

To 240 grams of de-ionized water was added 200 grams of 2% Pd/Ceria powder. The slurry was mixed thoroughly with a homogenizer and milled to a particle size of about 13. Alumina binder was added and the combination mixed thoroughly.

Catalyst Core Sample Preparation

Two 1" diameter by 3" long ceramic substrate cores with a cell density of 400 cells per square inch were dipped into the $Pd/CeO_2/Al_2O_3$ slurry. The excess slurry was blown off using an air gun. The coated cores were dried at 200° C. with a hot air blower for 5-10 minutes, followed by calcination in an oven for one hour at 500° C.

Core Sample Preparation for Testing

One of the core samples was subjected to an accelerated aging protocol to simulate the in-field use of a vehicle. The aging condition was set at 800° C. for 16 hours under an atmosphere of 10% water, 10% oxygen, and 80% nitrogen. The second core sample was tested without aging.

Example 2: Inventive Article (Pd/Sn/Ce)

LT-CO Catalyst Powder Preparation (2% Pd on 1% Sn/99% Ceria)

Sn Acetate (5 grams) was diluted it with 25 grams of acetic acid and 50 grams of de-ionized water. The solution was mixed for 3 minutes to homogenize the liquid. It became a colloidal solution, beige in color. Ceria (251 grams) was added into this solution and mixed for 3 minutes. The resulting powder was of a greyish-brown color. The powder was dried for 4 hours at 120° C. and calcined for one hour at 500° C. to provide 1% Sn on Ceria.

Pd nitrate (20 grams) was diluted with 40 grams of de-ionized water. The 1% Sn on Ceria powder (200 grams) was added to the Pd solution and mixed for 3 minutes to homogenize. The powder turned a gold color. The powder was dried for 4 hours at 120° C. and calcined for one hour at 500° C. to provide 2% Pd on the 1% Sn/99% Ceria support.

LT-CO Catalyst Washcoat Slurry Preparation

To 210 grams of de-ionized water was added 177 grams of the 2% Pd on 1% Sn/99% ceria powder. The slurry was thoroughly mixed and then milled until the resulting slurry had a particle size of about 7 microns. Finally, Alumina binder was added and mixed well.

LT-CO Catalyst Core Sample Preparation

Two 1" diameter by 3" long ceramic substrate cores with a cell density of 400 cells per square inch were dipped into the Pd/Sn/Ce washcoat slurry. The excess slurry was blown off using an air gun. The coated cores were dried at 200° C. with a hot air blower for 5-10 minutes, then calcined in an oven for one hour at 500° C.

LT-CO Core Sample Preparation for Testing

One of the core samples was subjected to an accelerated aging protocol to simulate the in-field use of a vehicle. The aging condition was set at 800° C. for 16 hours under an atmosphere of 10% water, 10% oxygen, and 80% nitrogen. The second core sample was tested without aging.

Example 3: Inventive LT-CO Catalytic Article (Pt/Sn/Ce)

Following the procedure for Example 2, but replacing Pd with Pt, samples were prepared containing 2% Pt on ceria containing from 1% to 4% Sn.
Catalytic Article Evaluation Example 4: Reactor Testing of the Core Samples (Steady State Light-Off)

Figure 6:
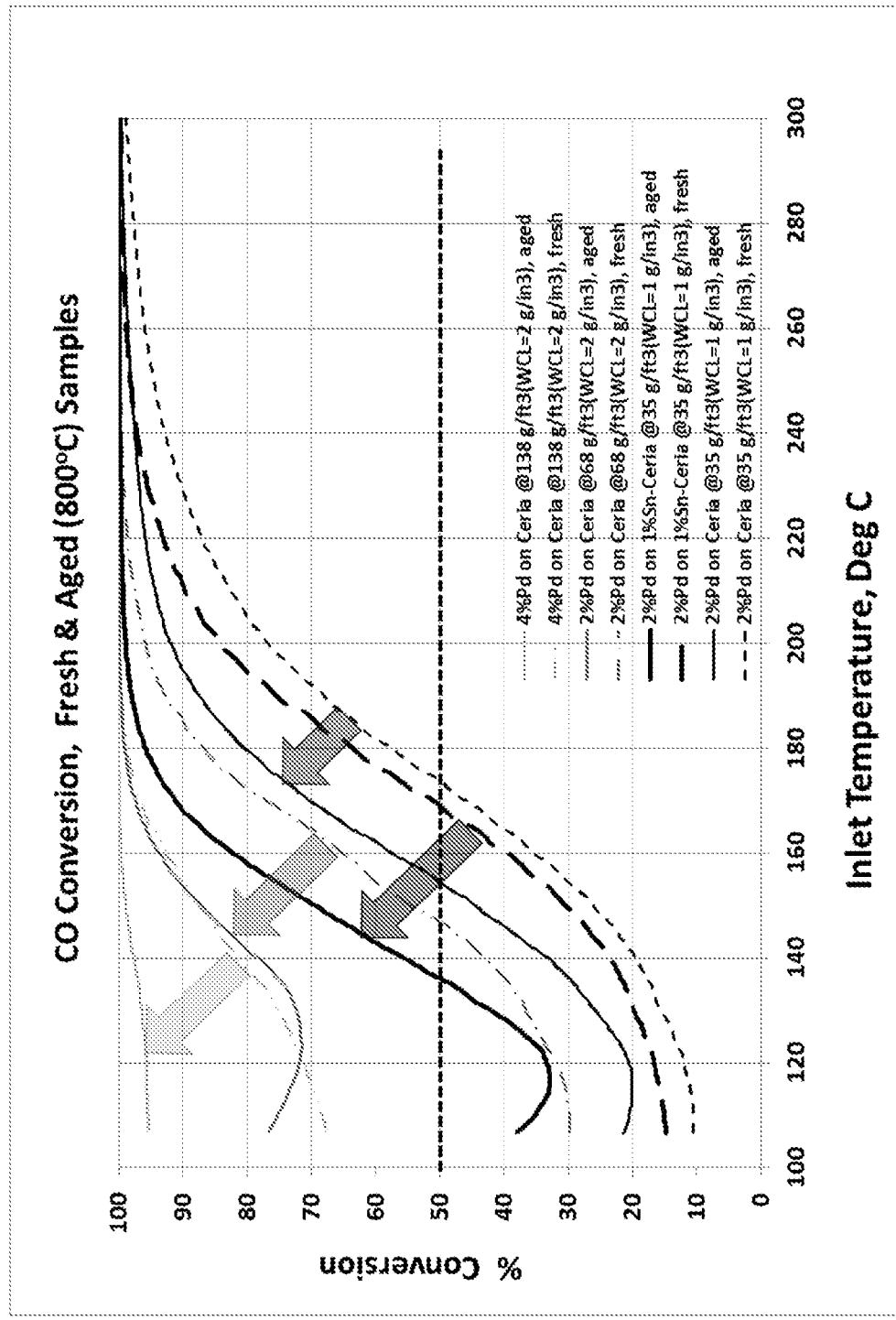
FIG. 6 is a line graph showing the CO conversion as a function of temperature for various catalyst composition samples of the disclosure.
Figure 7:
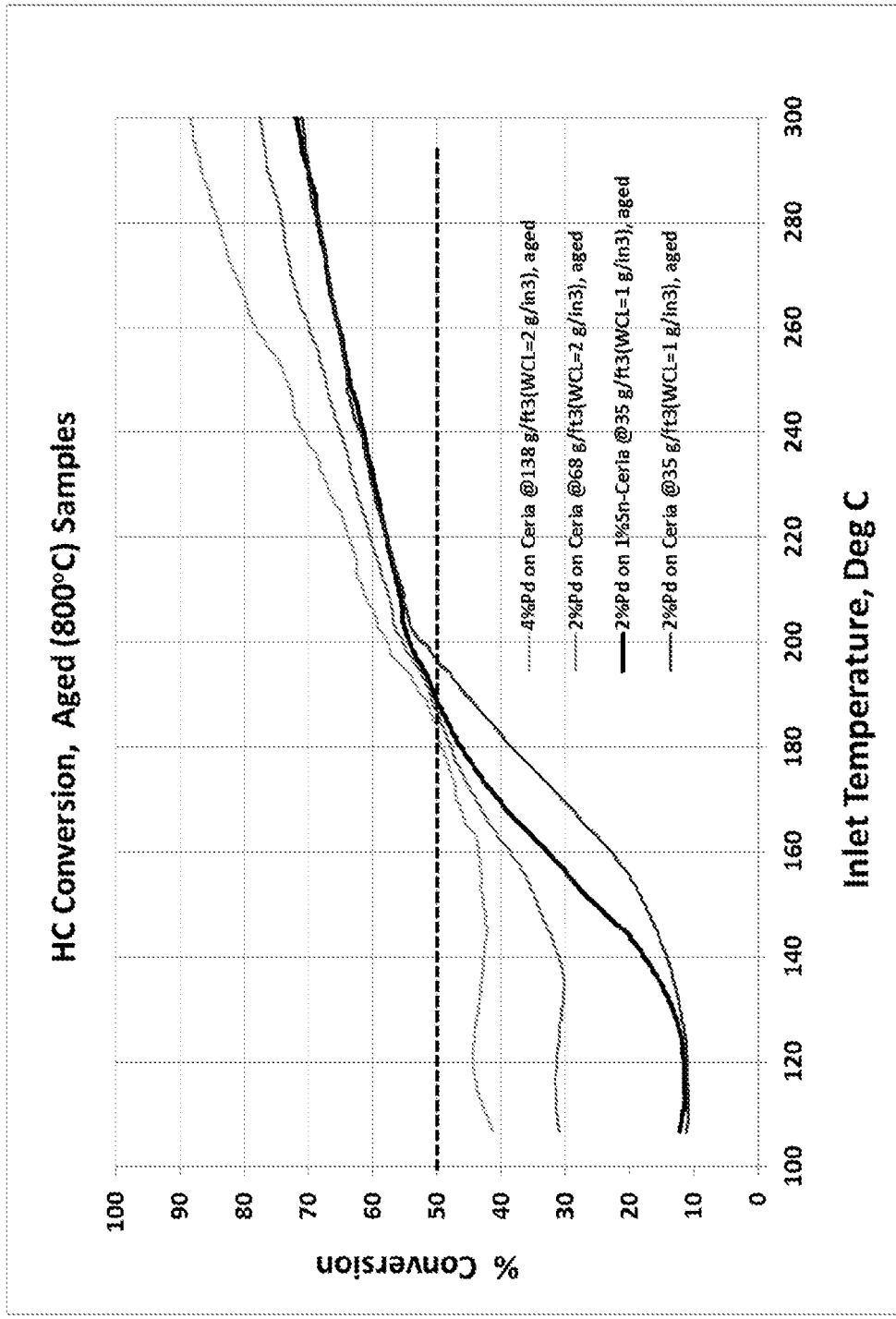
FIG. 7 is a line graph showing the HC conversion as a function of temperature for various catalyst composition samples of the disclosure.
Figure 8:
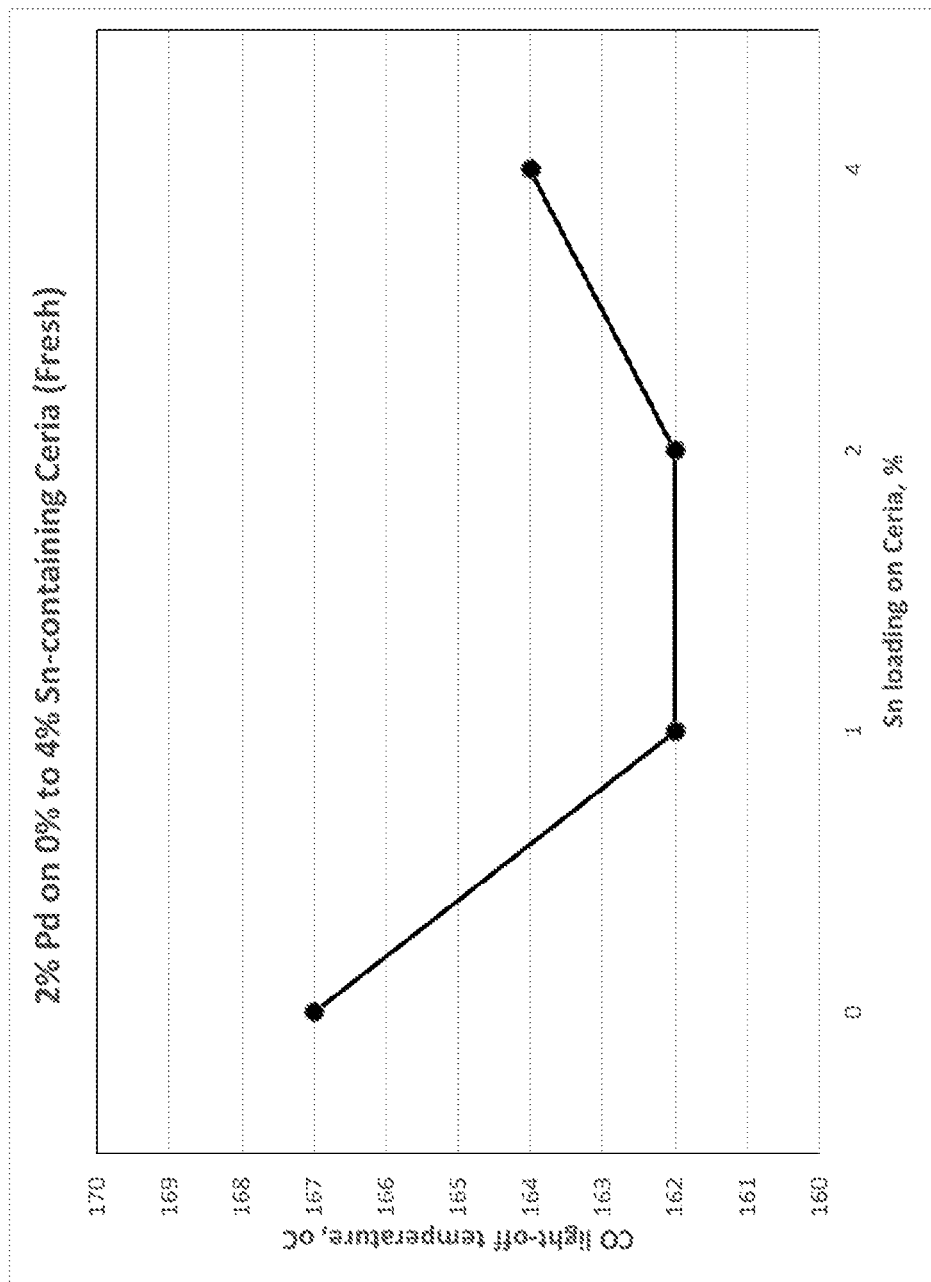
FIG. 8 is a line graph showing the CO light-off temperature as a function of tin (Sn) loading for various catalyst composition samples of the disclosure.
Figure 9:
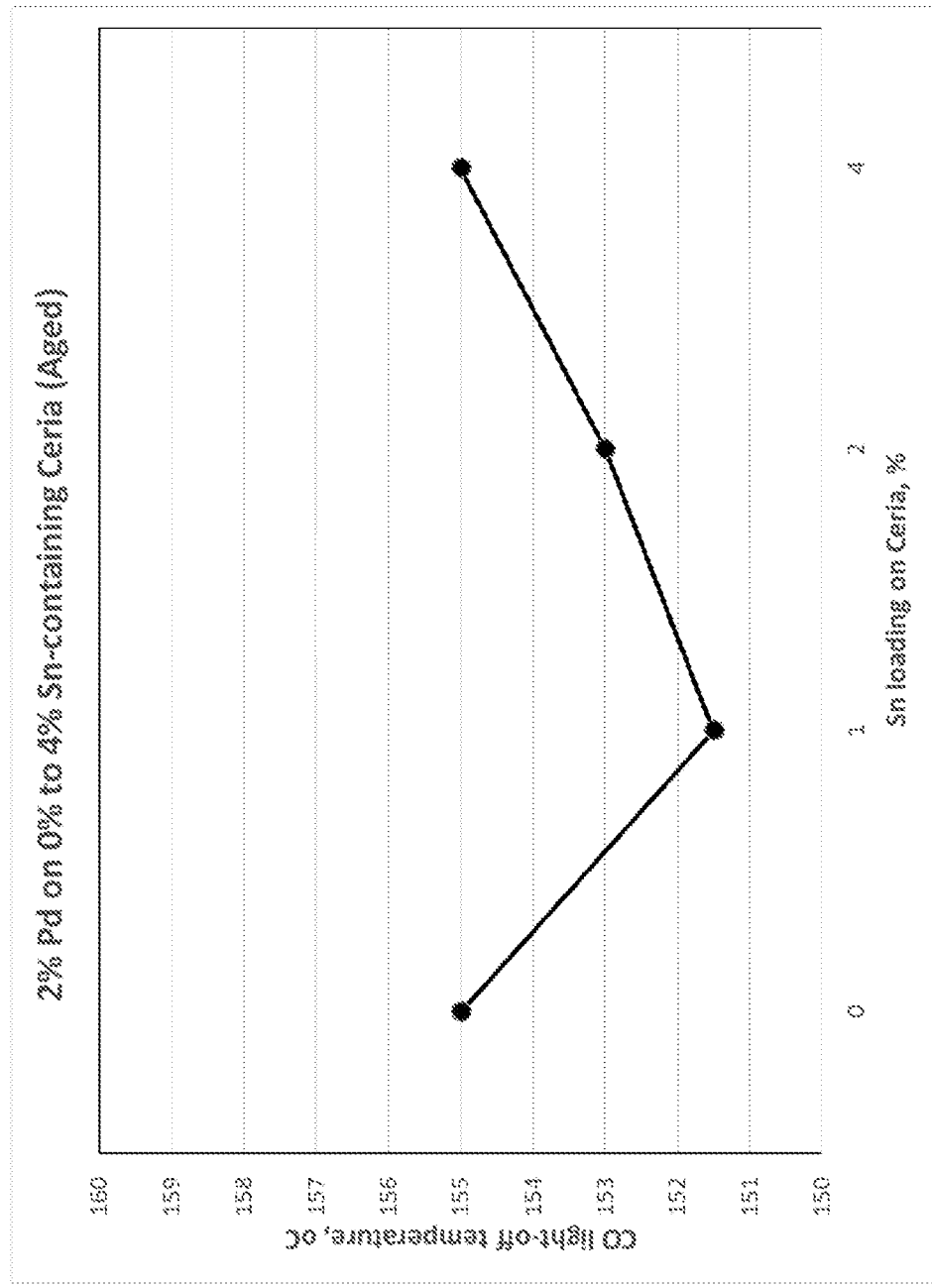
FIG. 9 is a line graph showing the CO light-off temperature as a function of tin (Sn) loading for various catalyst composition samples of the disclosure.
Figure 10:
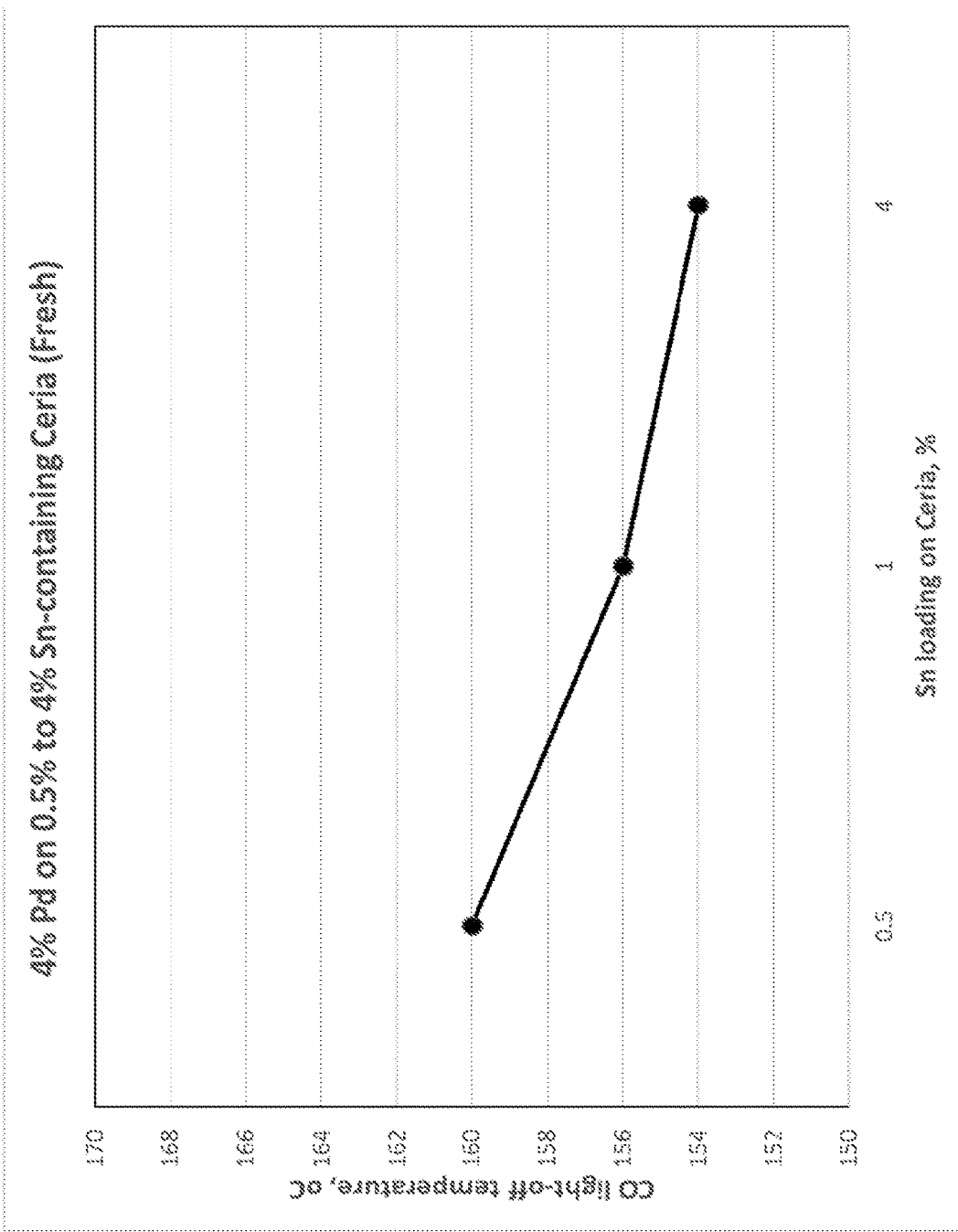
FIG. 10 is a line graph showing the CO light-off temperature as a function of tin (Sn) loading for various catalyst composition samples of the disclosure.
Figure 11:
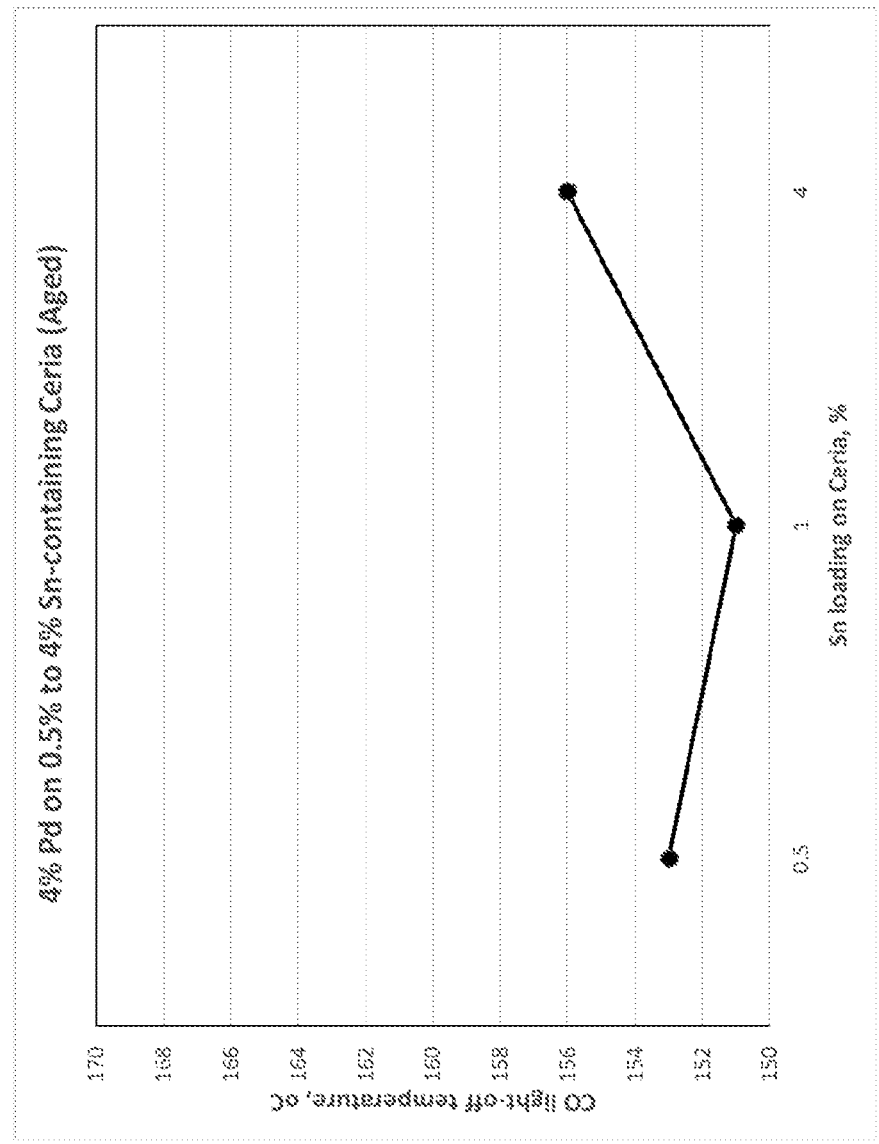
FIG. 11 is a line graph showing the CO light-off temperature as a function of tin (Sn) loading for various catalyst composition samples of the disclosure.

FIG. 6 illustrates the benefits of Sn addition to ceria in CO light-off, for both fresh and aged samples, with Pd. FIG. 7 illustrates the benefits of Sn addition to ceria in HC light-off, for both fresh and aged samples, with Pd. Activity measurement in light-off performance was conducted in a reactor with a feed gas composition as follows: CO=1500 ppm, NO=100 ppm, $H_2O$=10%, $CO_2$=4.6%, $O_2$=14%, $C_3H_6$=40 ppm, $CH_4$=30 ppm, Liquid HC's (36% Toluene/64% Decane (molar basis))=294 ppm $C_1$.

Example 5: Powder Screening

Powder Sample Preparation
A 6×8=48 tray powder reactor was used for the support screening study. The following procedure was used:
1. Impregnate support with Sn acetate solution
2. Dry at 120° C.
3. Calcine at 600° C. for 1 h in air
4. Impregnate with Pd-nitrate solution (if required)
5. Add water and Al-binder (5 wt % $Al_2O_3$ on carrier)
6. Add Pt-amine solution
7. Adjust pH to 4.5 (with $HNO_3$)
8. Mill 10 min at 600 rpm
9. Dry at 120° C.
10. Calcine at 450° C. for 1 h in air
11. Crush powder and sieve to 250-500 μm
12. Age at 800° C. for 16 h in an atmosphere of 10% $H_2O$ in air Powder Sample Testing
All samples (both fresh and aged) were evaluated under steady-state conditions at 120, 135, 150, 165, 180, 195, 210, 225, 250, 300, and 350° C. in the 48 tray rig as follows:
  3 min equilibration time+30 s sampling time at each reactor at each temperature;
  Catalyst mass: 0.1 g (i.e. normalized to the same total PGM amount in each reactor);
  GHSV: 50000 h−1;
  Feed gas with liquid HC: 700 ppm CO, 190 ppm C1 HC (130 ppm from decane, 60 ppm from propylene), 40 ppm NO, 10% O2, 6% $CO_2$, and 5% $H_2O$;
  Two runs; 30 s average data from the 2nd run was used for catalyst ranking.

The results are indicated in FIGS. 8-11, which demonstrate that a small amount of Sn (0.5-4%) addition to the ceria support in the presence of 2-4% Pd promoted CO light-off for both fresh and aged samples.

Figure 12:
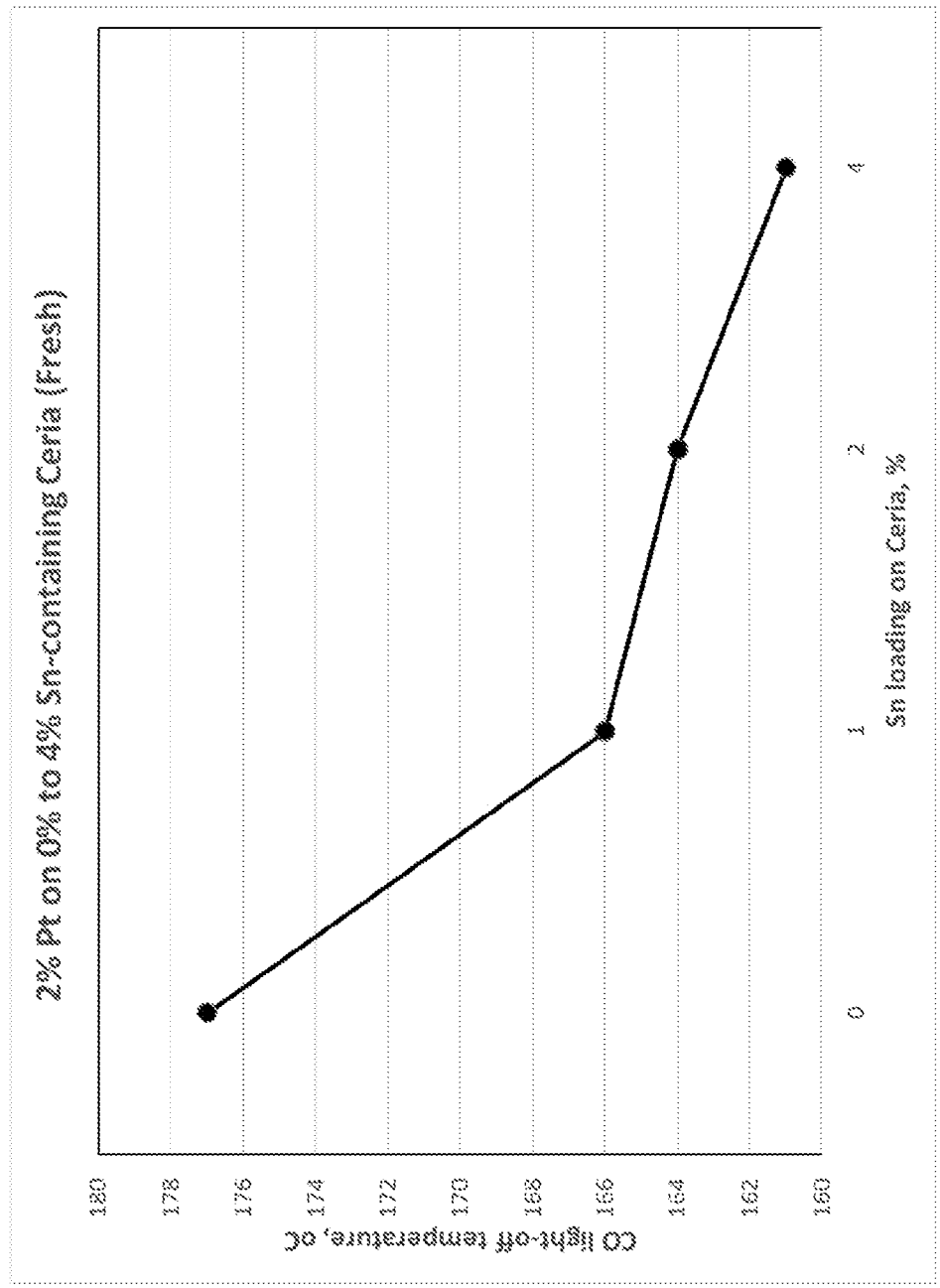
FIG. 12 is a line graph showing the CO light-off temperature as a function of tin (Sn) loading for various catalyst composition samples of the disclosure.
Figure 13:
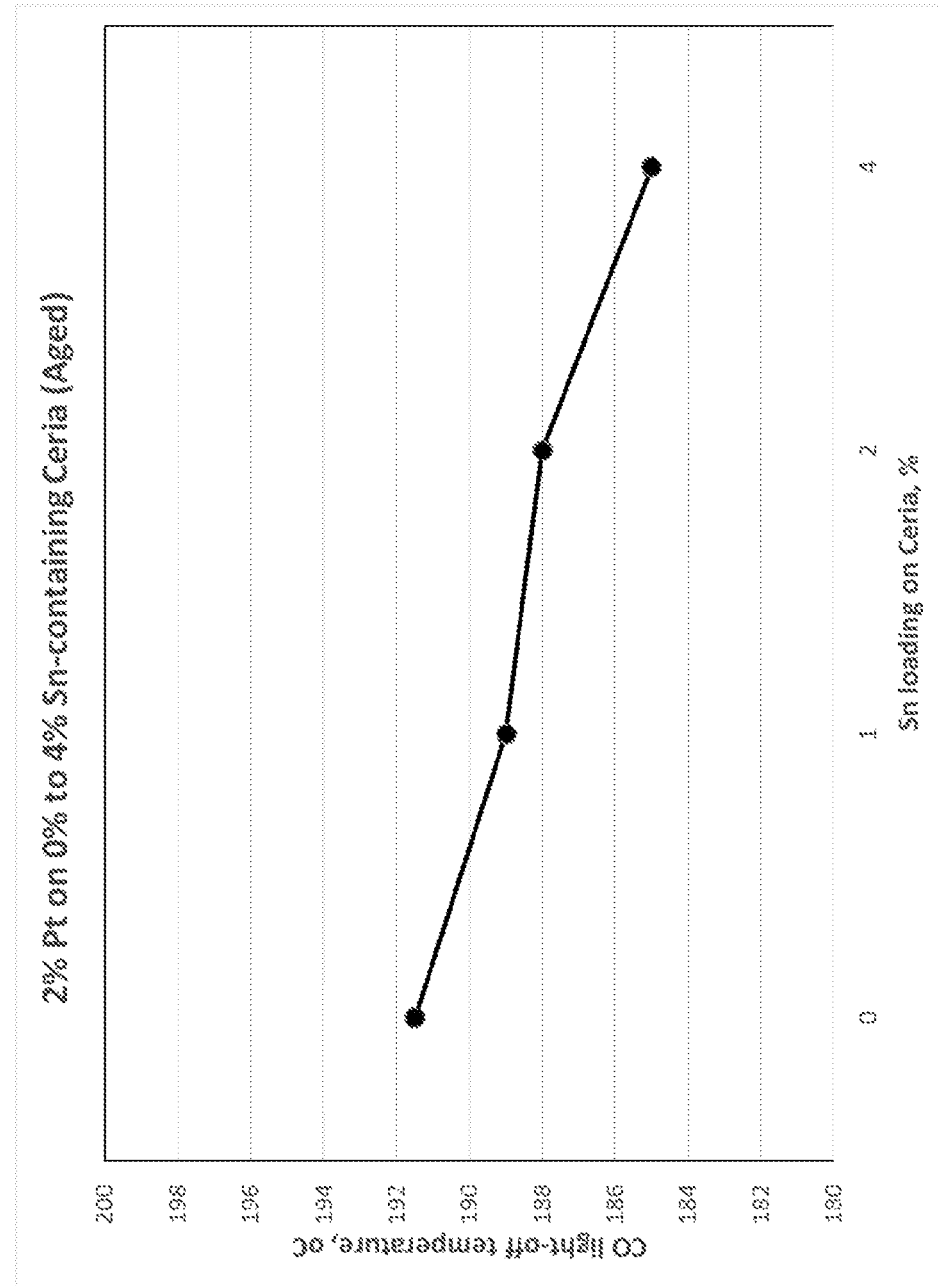
FIG. 13 is a line graph showing the CO light-off temperature as a function of tin (Sn) loading for various catalyst composition samples of the disclosure.

Similarly, FIGS. 12 and 13 demonstrate that a small amount of Sn (1-4%) addition to the ceria support in the presence of 2% Pt promoted CO light-off for both fresh and aged samples.

Figure 14:
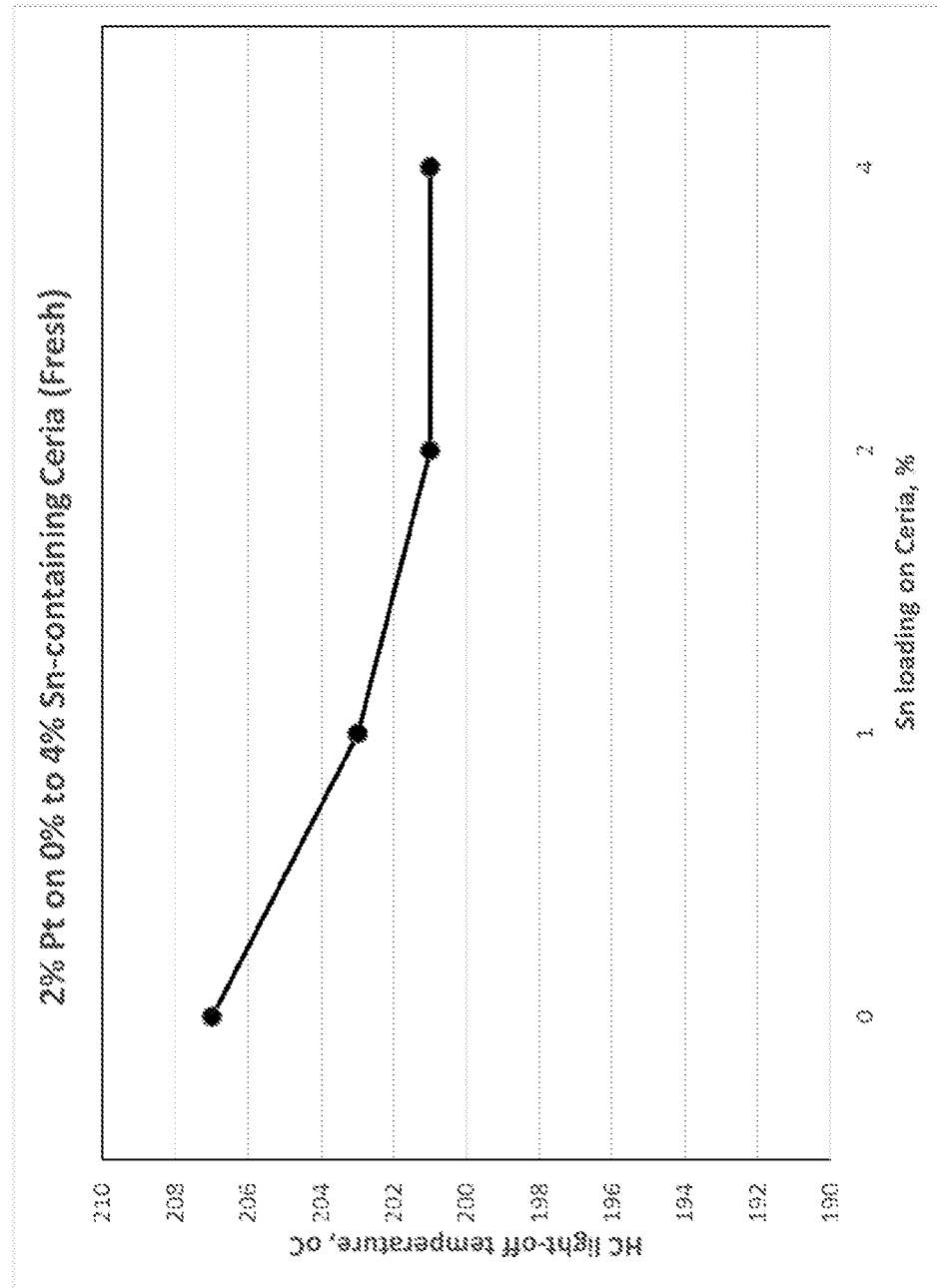
FIG. 14 is a line graph showing the HC light-off temperature as a function of tin (Sn) loading for various catalyst composition samples of the disclosure.
Figure 15:
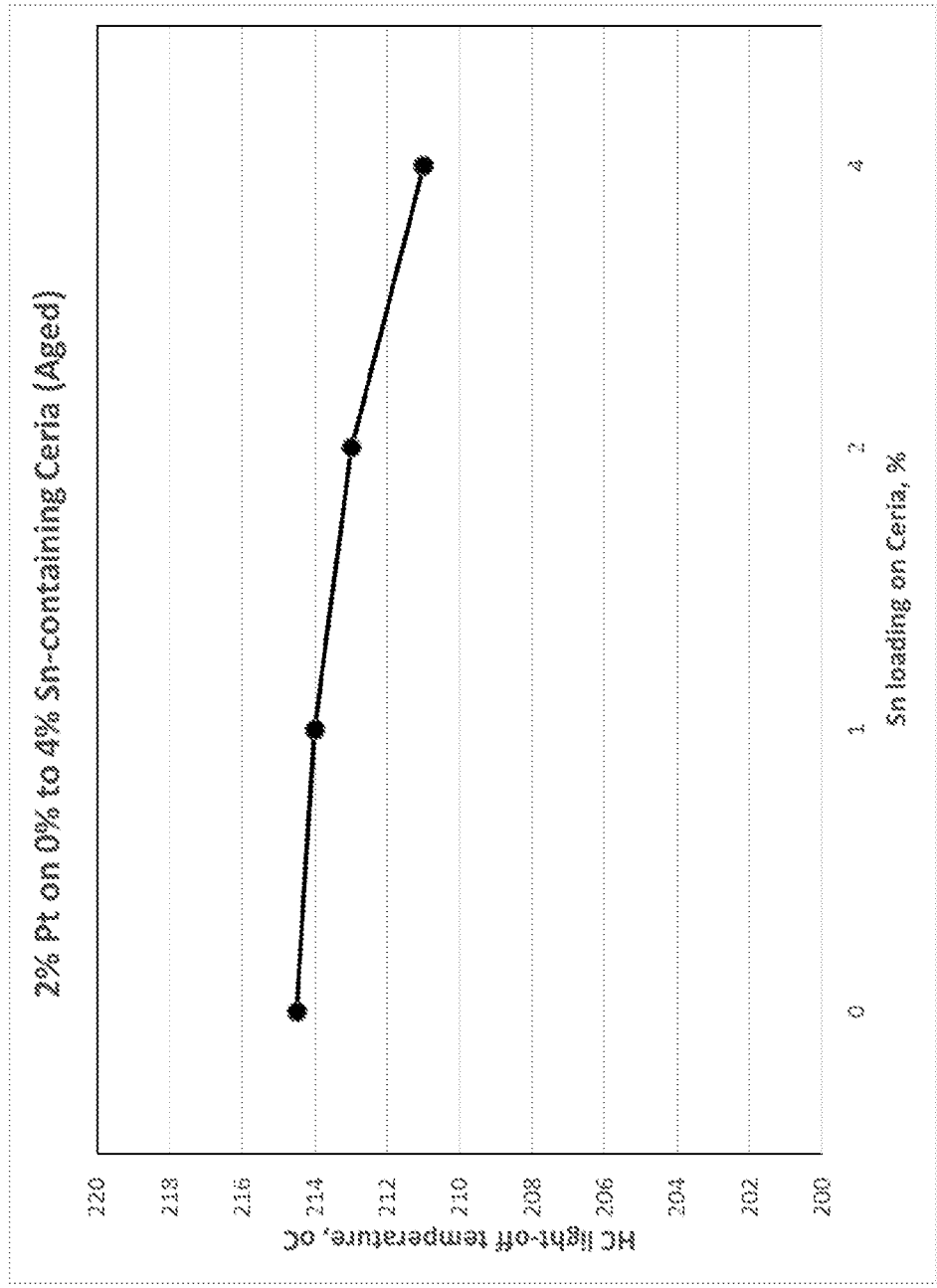
FIG. 15 is a line graph showing the HC light-off temperature as a function of tin (Sn) loading for various catalyst composition samples of the disclosure.

FIGS. 14 and 15 demonstrate that a small amount of Sn (1-4%) addition to the ceria support in the presence of 2% Pt promoted HC light-off for both fresh and aged samples.

Figure 16:
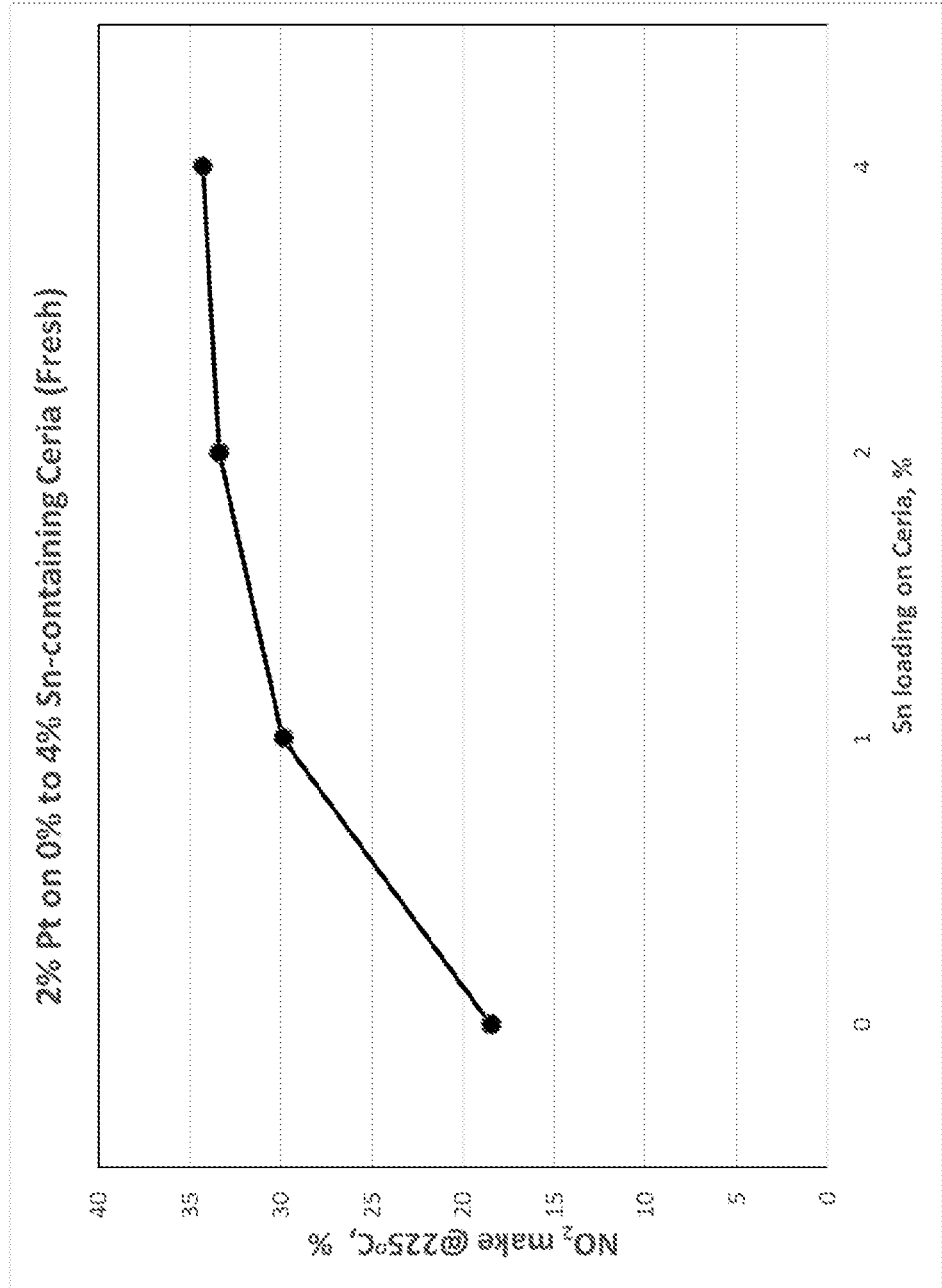
FIG. 16 is a line graph showing the $NO_2$ make as a function of tin (Sn) loading for various catalyst composition samples of the disclosure.
Figure 17:
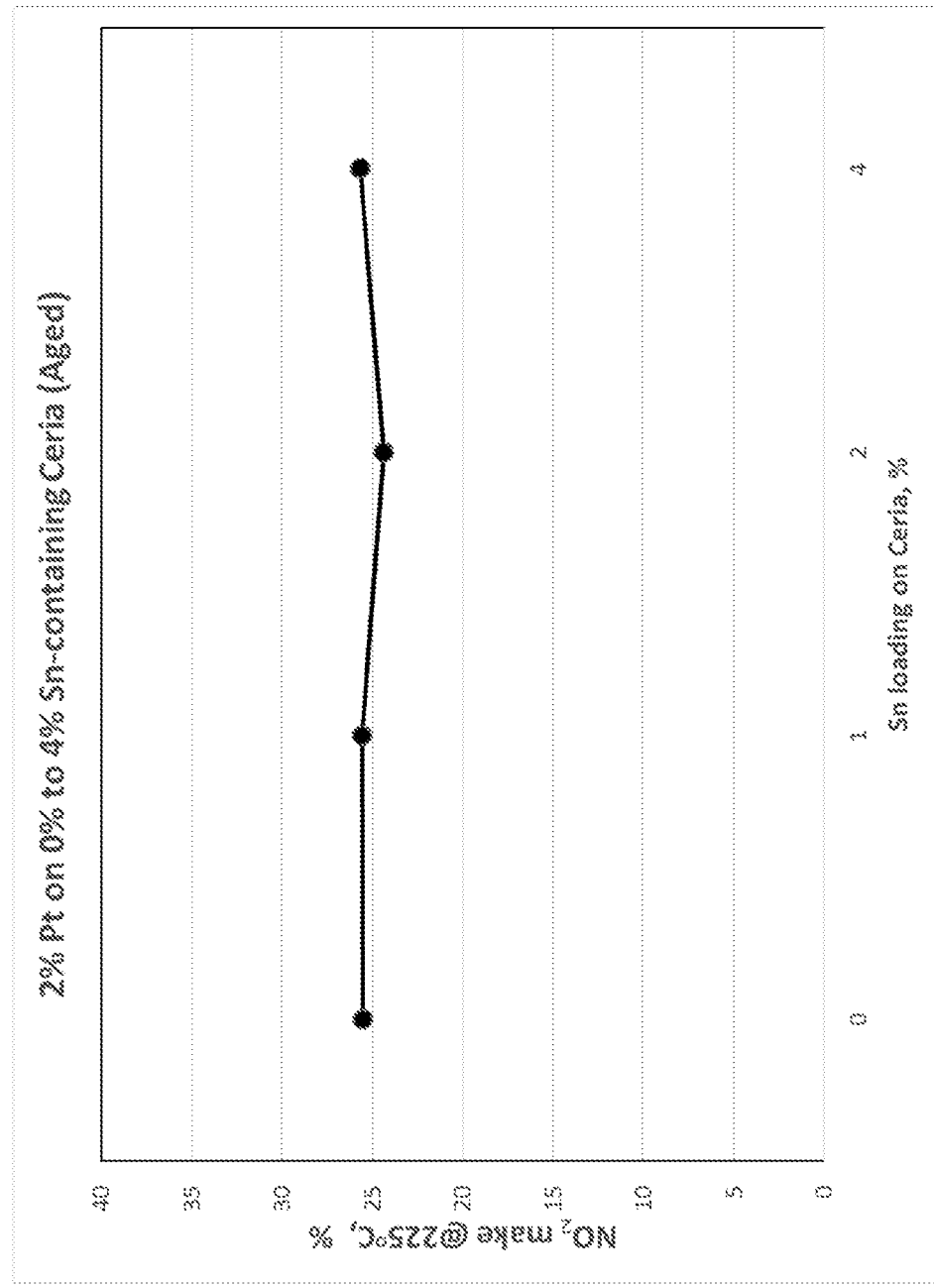
FIG. 17 is a line graph showing the $NO_2$ make as a function of tin (Sn) loading for various catalyst composition samples of the disclosure.

FIGS. 16 and 17 demonstrate that a small amount of Sn (1-4%) addition to the ceria support in the presence of 2% Pt increased $NO_2$ formation for both fresh and aged samples.

Example 4: Reactor Testing of the Core Samples (Dynamic Conditions)

Figure 18:
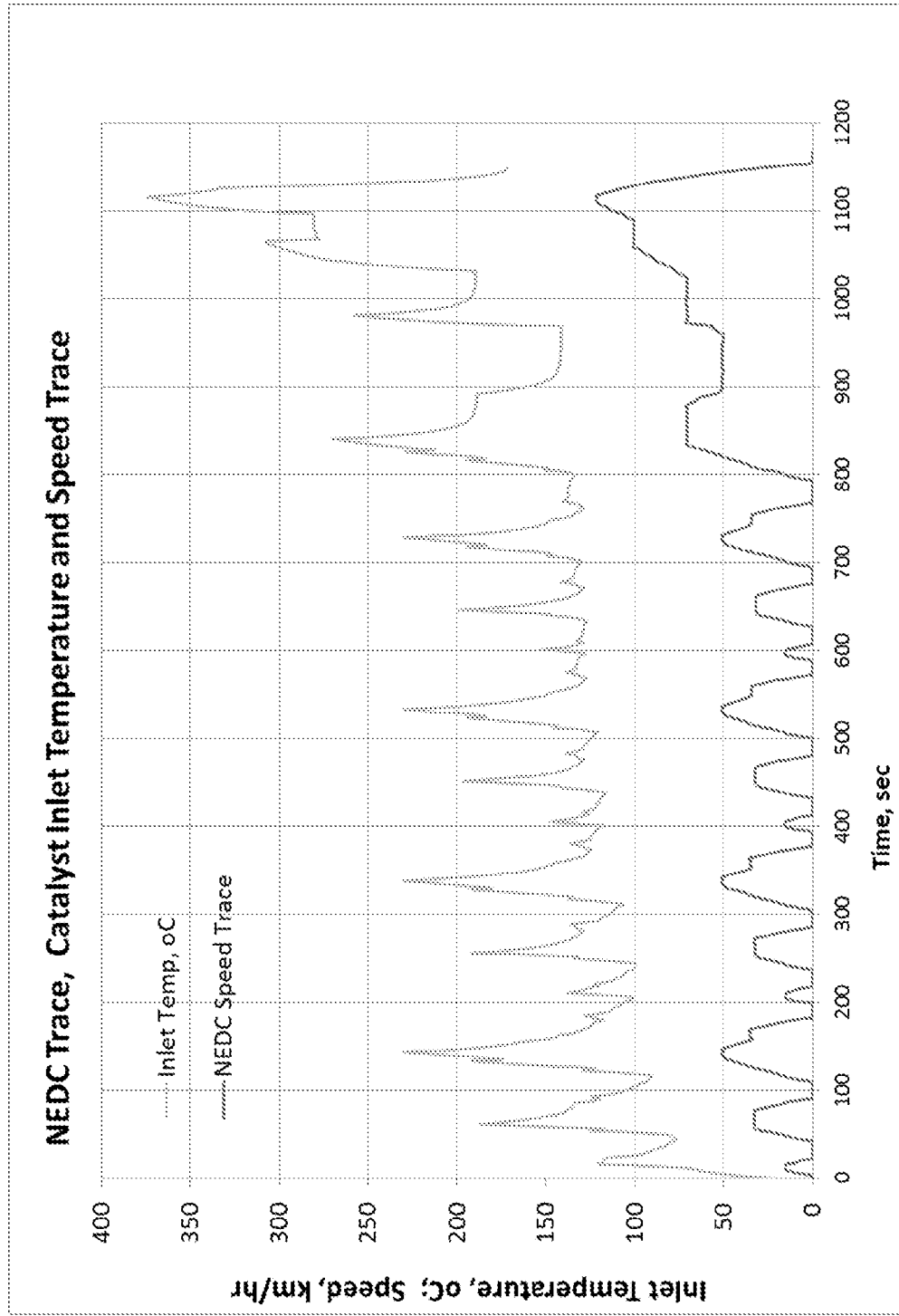
FIG. 18 is a line graph showing the simulated exhaust gas flow conditions, along with temperature and speed profile, for the New European Driving Cycle (NEDC)

Both the fresh and the aged core samples were evaluated under simulated NEDC (New European Driving Cycle) conditions. The simulated exhaust gas flow conditions, along with temperature and speed profile for the NEDC cycle, are shown in FIG. 18.

Figure 19:
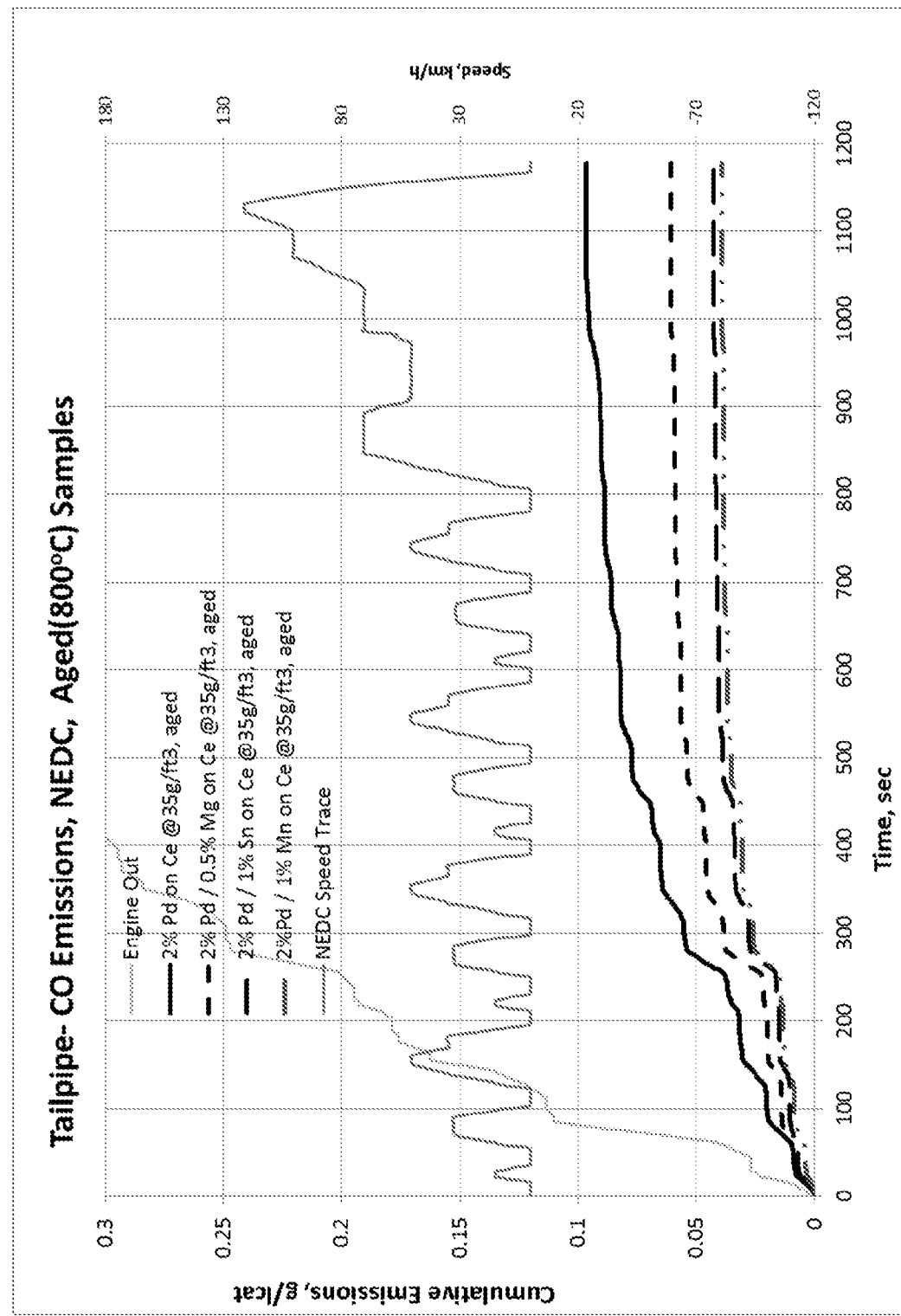
FIG. 19 is a line graph showing cumulative tailpipe CO emissions under the NEDC protocol for various catalyst composition samples of the disclosure.

FIG. 19 demonstrates the reduction in cumulative tailpipe CO emissions under the NEDC protocol for exemplary Pd/ceria oxidation catalyst compositions of the disclosure promoted with Mg, Sn, or Mn.

Figure 20:
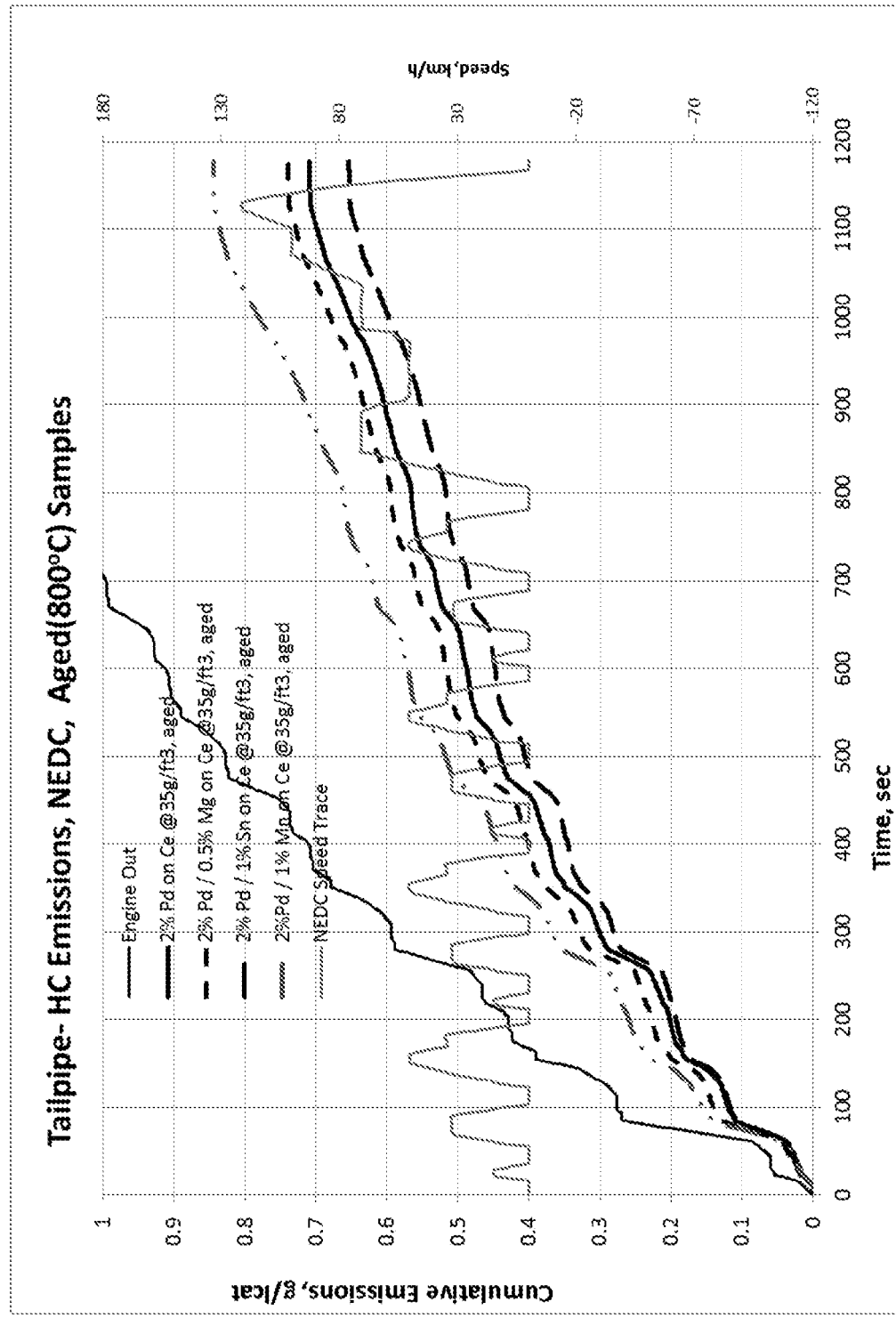
FIG. 20 is a line graph showing cumulative tailpipe HC emissions under the NEDC protocol for various catalyst composition samples of the disclosure.

FIG. 20 demonstrates the reduction in cumulative tailpipe HC emissions under the NEDC protocol for exemplary Pd/ceria oxidation catalyst compositions of the disclosure promoted with Mg, Sn, or Mn.

Example 6. Multi-Layer Core Sample Preparation and Evaluation

Sample A—Inventive Article.
Bottom Layer Catalyst Powder
  Weighed 212 grams of ceria and 54 grams of zeolite (chabazite), mixed well. Weighed 8 grams of Sn-acetate, added 30 grams of acetic acid and 25 grams of DI-$H_2O$. Mixed well. Added Sn-containing mixture to ceria+zeolite powder and mixed well. The moist powder had a greenish-gray color. Dried the above powder for 4 hours at 120° C. & calcined for 1 hour at 500° C. Weighed 37 grams of Pd-nitrate and diluted it with 50 grams of DI-$H_2O$. Added Pd mixture onto the calcined Sn/ceria/zeolite powder and mixed well. Dried the above powder for 4 hours at 120° C. and calcined for 1 hour at 500° C.
Bottom Layer Catalyst Washcoat Slurry
  Weighed 386 grams of DI-$H_2O$, added the above calcined powder into the water and mixed well. Added 2 grams of Ba hydroxide and mixed well. Added 1 gram of tartaric acid and mixed well. Milled until the particle size was 9.2 microns. Finally, 28 grams of alumina-binder was added and mixed well.
Catalyst Core Sample Preparation (1)
  Two 1" diameter by 3" long ceramic substrate cores with a cell density of 400 cells per square inch were dipped into the Bottom Layer washcoat slurry. The excess slurry was blown off using an air gun. The coated cores were dried at 200° C. with a hot air blower for 5-10 minutes followed by calcination in an oven for one hour at 500° C.
Middle Layer Catalyst Slurry
  Weighed 402 grams of DI-$H_2O$, added 195 grams of 2% Pd/Ferrierite/ZSM-5 into it (FER/MFI ratio of 10:1). Mixed well, to a particle size of 5.1 microns. Added 91 grams of H-beta zeolite and mixed well. pH=3.7 and the solids concentration within the slurry was 33.9.
Catalyst Core Sample Preparation (2)
  The above bottom-layer coated cores were dipped into the above middle layer slurry. The coated cores were dried at 200° C. with a hot air blower for 5-10 minutes followed by calcination in an oven for one hour at 500° C.
Top Layer Catalyst Slurry
  Weighed 282 grams of 5% Si on alumina and 29 grams of alumina containing 5% Mn. Weighed 58 grams of Pt-amine solution, diluted it with 80 grams of DI-$H_2O$, and added 325 grams of DI-$H_2O$ and mixed well. Ball milled for 2 hours, until achieving a particle size of 17.5 microns. Added 15 grams of ZSM-5, 44 grams of Si-binder and 6 grams of Al-binder & mixed well.

Catalyst Core Sample Preparation (3)

The above bottom and middle layer coated cores were dipped into the above top layer slurry. The coated cores were dried at 200° C. with a hot air blower for 5-10 minutes, followed by calcination in an oven for one hour at 500° C. The resulting core samples had a PGM loading of 150 g/ft$^3$ with a Pt/Pd ratio of 13:17.

Sample B—Inventive Article.

Sample B was prepared in the same manner as Sample A, but the washcoat layer arrangement was altered such that the middle layer slurry of Sample A was coated on the core as the bottom layer, and the bottom layer slurry of Sample A was coated as the middle layer. The top layer remained the same.

Sample C (Reference Article)
Bottom Layer Catalyst Washcoat Slurry

Impregnated 5 g of Pd and 10 g of Pt onto 5% Silica-coated alumina (1000 g). Weighed 2000 grams of DI-H$_2$O. Added barium hydroxide into the DI-H$_2$O, along with the impregnated PGM powder. Milled until the particle size was less than 10 microns.

Catalyst Core Sample Preparation (1)

Two 1" diameter by 3" long ceramic substrate cores with a cell density of 400 cells per square inch were dipped into the Pd/Pt/alumina/Ba slurry. The excess slurry was blown off using an air gun. The coated cores were dried at 200° C. with a hot air blower for 5-10 minutes, followed by calcination in an oven for one hour at 500° C.

Top Layer Inlet Zone Catalyst Washcoat Slurry

Impregnate 2.5 g of Pd and 2.5 g of Pt onto 5% Silica-coated alumina (200 g). Weighed 450 grams of DI-H$_2$O. Added barium hydroxide (5 g) into the DI-H$_2$O, along with the impregnated PGM powder. Add 200 g of zeolite Fe-Beta (1.2% Fe) into the above slurry. Added alumina-binder and milled until the particle size was less than 10 microns.

Catalyst Core Sample Preparation (2)

The above bottom-layer coated cores were dipped halfway, into the above Top Layer Inlet Zone slurry. The excess slurry was blown off using an air gun. The coated cores were dried at 200° C. with a hot air blower for 5-10 minutes.

Top Layer Outlet Zone Catalyst Washcoat Slurry

Impregnated 14 g of Pt onto 5% Silica-coated alumina (300 g). Weighed 450 grams of DI-H$_2$O. Added zeolite Beta (60 g) into the DI-H$_2$O, along with the impregnated PGM powder. Added alumina-binder. Added nitric acid and acetic acid to adjust pH to 4.5. Continuous milled @ 2500 rpm until the particle size was less than 10 microns.

Catalyst Core Sample Preparation (3)

The above coated cores from (2) were dipped halfway into the above Top Layer Outlet Zone slurry. The excess slurry was blown off using an air gun. The coated cores were dried at 200° C. with a hot air blower for 5-10 minutes. The resulting core samples had a PGM loading of 150 g/ft$^3$ with a Pt/Pd ratio of 3:1.

Core Sample Preparation for Testing

All samples were aged at 800° C. for 16 hours, in a tube furnace, under a 10% H$_2$O, 10% O$_2$, balance N$_2$ atmosphere.

Reactor Testing of the Core Samples

Figure 21:
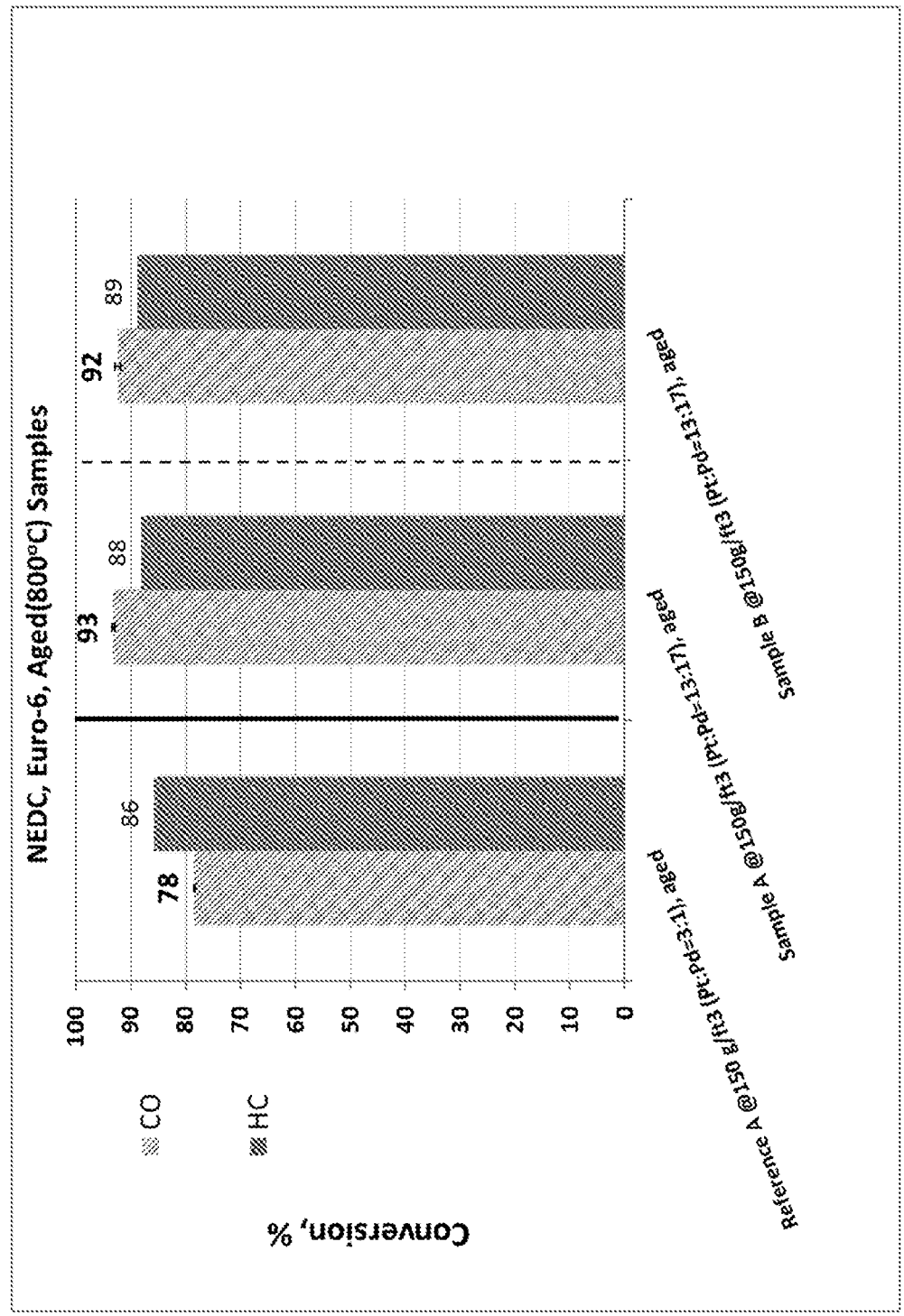
FIG. 21 is a bar graph showing the CO and HC conversion for various catalyst composition samples under the New European Driving Cycle (NEDC).

All samples were evaluated under a simulated European Urban Driving Cycle (EUDC) condition, as stated in Example 3. Results for the aged samples are illustrated in FIG. 21 and summarized in Table 1.

TABLE 1

Reactor Testing Results.

| Sample ID | Total PGM Loading (g/ft$^3$) and Pt:Pd ratio | HC conversion, % | CO conversion, % |
|---|---|---|---|
| Reference, Sample C | 150 (3:1) | 86 | 78 |
| Sample A | 150 (13:17) | 88 | 93 |
| Sample B | 150 (13:17) | 89 | 92 |

The Sn—Ce containing samples, Samples A and B, demonstrated superior CO conversion performance relative to the reference zone-coated catalyst (Reference, Sample C), regardless of where the Sn—Ce compound was placed (bottom layer or middle layer).

What is claimed is:

1. A low temperature carbon monoxide (LT-CO) oxidation catalyst composition for abatement of exhaust gas emissions from a lean burn engine, the LT-CO oxidation catalyst composition comprising:
    an oxygen storage component (OSC) comprising ceria; a first platinum group metal (PGM) component selected from palladium (Pd), platinum (Pt), and combinations thereof; and
    a first promoter metal selected from tin (Sn) or an oxide thereof;
    wherein the OSC is impregnated with the first PGM component and the first promoter metal;
    wherein the first promoter metal is present in an amount ranging from about 1% by weight to about 4% by weight of the OSC alone, calculated on a metal oxide basis; and
    wherein the LT-CO oxidation catalyst composition is effective for oxidizing carbon monoxide and hydrocarbons under cold start conditions.

2. The LT-CO oxidation catalyst composition of claim 1, wherein the first PGM component is present in an amount ranging from about 1% to about 10% by weight of the OSC alone.

3. The LT-CO oxidation catalyst composition of claim 1, wherein the OSC comprises a rare earth metal oxide in an amount ranging from about 0.1 weight percent to about 100 weight percent, based on the total weight of the OSC alone.

4. The LT-CO oxidation catalyst composition of claim 1, wherein the first PGM component is present at about 2 wt % and the Sn is present at about 1 wt %.

5. The LT-CO oxidation catalyst composition of claim 1, further comprising a first refractory metal oxide chosen from alumina, silica, zirconia, titania, yttria, and combinations thereof.

6. The LT-CO oxidation catalyst composition of claim 1, further comprising a first zeolite chosen from one or more small pore zeolites having a 6- to 8-membered ring structure and one or more medium or large pore zeolites having a 10- to 12-membered ring structure.

7. The LT-CO oxidation catalyst composition of claim 6, wherein the one or more small pore zeolites are chosen from chabazite, zeolite A, and combinations thereof and the one or more medium or large pore zeolites are chosen from beta zeolite, Y zeolite, ferrierite, ZSM-5, and combinations thereof.

8. The LT-CO oxidation catalyst composition of claim 1, further comprising an alkaline earth metal component chosen from an oxide of magnesium, calcium, strontium, and barium or a combination thereof.

9. A catalytic article comprising:
a substrate having an inlet end and an outlet end defining an overall length; and
a first washcoat comprising the LT-CO oxidation catalyst composition of claim 1 disposed on at least a portion of the substrate.

10. The catalytic article of claim 9, wherein the first washcoat is present on the substrate with a loading of at least about 0.5 g/in$^3$.

11. The catalytic article of claim 9, wherein the substrate is a honeycomb substrate in the form of a wall-flow filter or a flow-through monolith.

12. The catalytic article of claim 9, wherein the cold start conditions comprise an exhaust gas temperature that is below about 150° C.

13. The catalytic article of claim 9, further comprising a hydrocarbon (HC) trap composition, a low temperature NO$_x$ adsorber (LT-NA) composition, or a lean NO$_x$ trap (LNT) composition.

14. A catalytic article comprising:
a substrate having an inlet end and an outlet end defining an overall length,
a first washcoat comprising an LT-CO oxidation catalyst composition disposed on at least a portion of the substrate, and
a diesel oxidation catalyst (DOC) composition, the DOC composition comprising:
a second washcoat comprising a second zeolite, wherein the second zeolite is impregnated with a second PGM component; and
a third washcoat comprising a third zeolite and a second refractory metal oxide, wherein the third zeolite, the second refractory metal oxide, or both, are impregnated with a third PGM component;
wherein the low temperature carbon monoxide (LT-CO) oxidation catalyst composition comprises:
an oxygen storage component (OSC); a first platinum group metal (PGM) component; and
a first promoter metal;
wherein the OSC is impregnated with the first PGM component and the first promoter metal; and wherein the LT-CO oxidation catalyst composition is effective for oxidizing carbon monoxide and hydrocarbons under cold start conditions.

15. The catalytic article of claim 14, wherein the second refractory metal oxide is impregnated with a second promoter metal.

16. The catalytic article of claim 14, wherein the second PGM component and the third PGM component independently comprise Pt, Pd, or a combination thereof.

17. The catalytic article of claim 14, wherein the second zeolite and the third zeolite each comprise a hydrothermally stable zeolite in the form of a 6- to 12- membered ring structure independently chosen from ZSM-5, beta, mordenite, Y zeolite, chabazite, ferrierite, and combinations thereof.

18. The catalytic article of claim 14, wherein the first, second and third washcoats of the catalytic article are layered or zoned.

19. The catalytic article of claim 18, having a zoned configuration, wherein the first washcoat is disposed on the substrate from either the inlet end or the outlet end to a length of from about 10% to about 90% of the overall length; the second washcoat is disposed on the substrate from either the inlet end or the outlet end to a length from about 90% to about 10% of the overall length; and the third washcoat is coated on top of the first washcoat and the second washcoat.

20. The catalytic article of claim 18, wherein the first washcoat further comprises a small pore zeolite, a large pore zeolite, an alkaline earth metal component, or a combination thereof.

21. An exhaust gas treatment system for treatment of a lean burn engine exhaust gas stream comprising hydrocarbons, carbon monoxide, nitrogen oxides, and particulate matter, the exhaust gas treatment system comprising:
a lean burn engine producing an exhaust gas stream;
an exhaust conduit in fluid communication with the lean burn engine via an exhaust manifold; and
the catalytic article of claim 9 positioned downstream from the lean burn engine and in fluid communication with the exhaust gas stream.

22. The exhaust gas treatment system of claim 21, further comprising one or more additional components chosen from a soot filter, a selective catalytic reduction (SCR) catalyst, a urea injection component, an ammonia oxidation (AMOx) catalyst, a low-temperature NO$_x$ absorber (LT-NA), and a lean NO$_x$ trap (LNT).

23. A method for treating a lean burn engine exhaust gas stream, the method comprising contacting the exhaust gas stream with the catalytic article of claim 9.

24. A method for reducing CO and/or HC levels in an exhaust gas stream, the method comprising contacting the exhaust gas stream with the catalytic article of claim 9, for a time and at a temperature sufficient to reduce the levels of CO and/or HC in the gas stream.

25. The method of claim 24, wherein the CO and/or HC levels in the exhaust gas stream are reduced by at least 30% compared to the CO and/or HC levels in the gas stream prior to contact with the catalytic article.

* * * * *